(12) United States Patent
Mashima et al.

(10) Patent No.: US 7,548,685 B2
(45) Date of Patent: Jun. 16, 2009

(54) ROTATING DEVICE, BARREL UNIT, IMAGE SENSING APPARATUS INSTALLED WITH THE SAME

(75) Inventors: Hiroshi Mashima, Sakai (JP); Kazuhiro Shibatani, Sakai (JP)

(73) Assignee: Konica Minolta Photo Imaging, Inc., Tokyo (JP)

(*) Notice: Subject to any disclaimer, the term of this patent is extended or adjusted under 35 U.S.C. 154(b) by 465 days.

(21) Appl. No.: 11/355,218

(22) Filed: Feb. 15, 2006

(65) Prior Publication Data
US 2006/0285837 A1 Dec. 21, 2006

(30) Foreign Application Priority Data
Jun. 21, 2005 (JP) ............................. 2005-180137

(51) Int. Cl.
*G03B 17/00* (2006.01)
(52) U.S. Cl. .................... 396/53; 396/55; 396/342; 348/208.99; 348/208.4; 348/208.7; 348/208.11
(58) Field of Classification Search ................ 396/55, 396/342, 53; 348/208.4, 208.7, 208.11, 208.99
See application file for complete search history.

(56) References Cited
U.S. PATENT DOCUMENTS
5,386,264 A * 1/1995 Sekine et al. ................ 396/55

| | | | |
|---|---|---|---|
| 5,771,069 A * | 6/1998 | Kobayashi | 348/208.11 |
| 5,859,665 A * | 1/1999 | Hibi | 348/208.8 |
| 2002/0112543 A1* | 8/2002 | Noguchi | 73/618 |
| 2006/0285838 A1* | 12/2006 | Mashima et al. | 396/55 |

FOREIGN PATENT DOCUMENTS
JP 05-107620 4/1993
JP 07-274056 10/1995

* cited by examiner

*Primary Examiner*—W. B. Perkey
*Assistant Examiner*—Michael A Strieb
(74) *Attorney, Agent, or Firm*—Brinks Hofer Gilson & Lione

(57) ABSTRACT

A rotating device 9 is for rotating a vertically long drivable element 90 about specified two axes (rotation axis A, rotation axis B) and is provided with a first and a second actuators 91A, 91B for giving torques to the drivable element 90, a pivot bearing portion 92 as a rotation supporting point of the drivable element 90, a first and a second position detecting sensors 93A, 93B for detecting the rotational posture of the drivable element 90, and a posture controller 94. Detecting portions 905A, 905B of the first and second position detecting sensors 93A, 93B are arranged on a straight line L1 connecting acting portions 904A, 904B of the first and second actuators 91A, 91B and near the acting portions 904A, 904B. The position of the drivable element can be detected by a simple construction and the drivable element can be quickly returned to an original position.

14 Claims, 24 Drawing Sheets

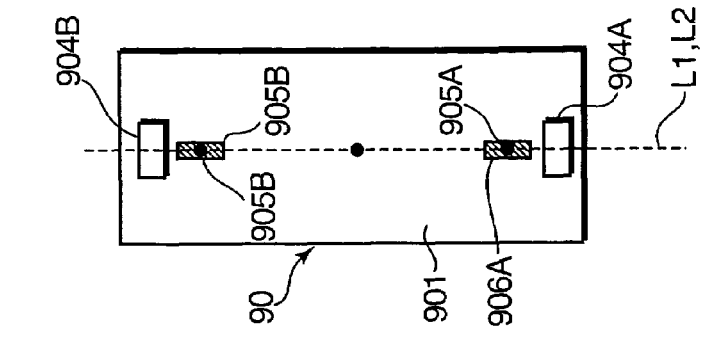
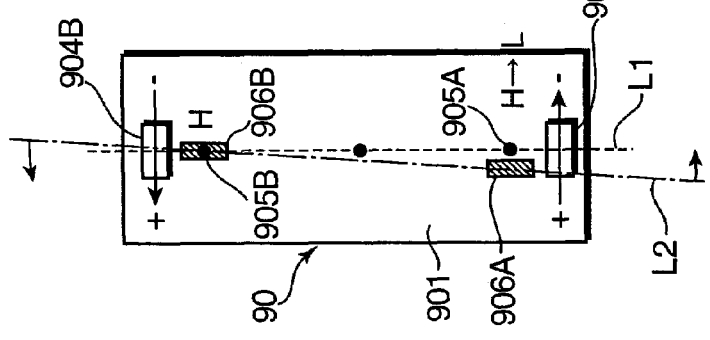
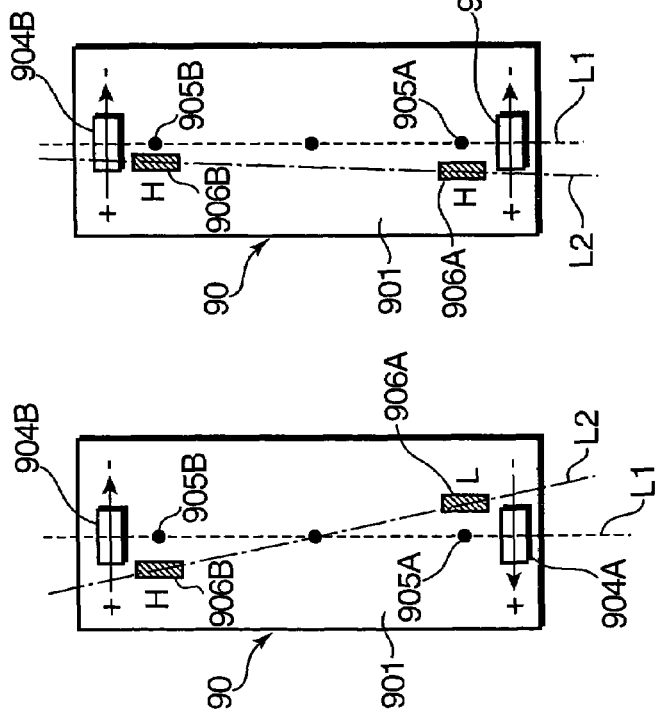

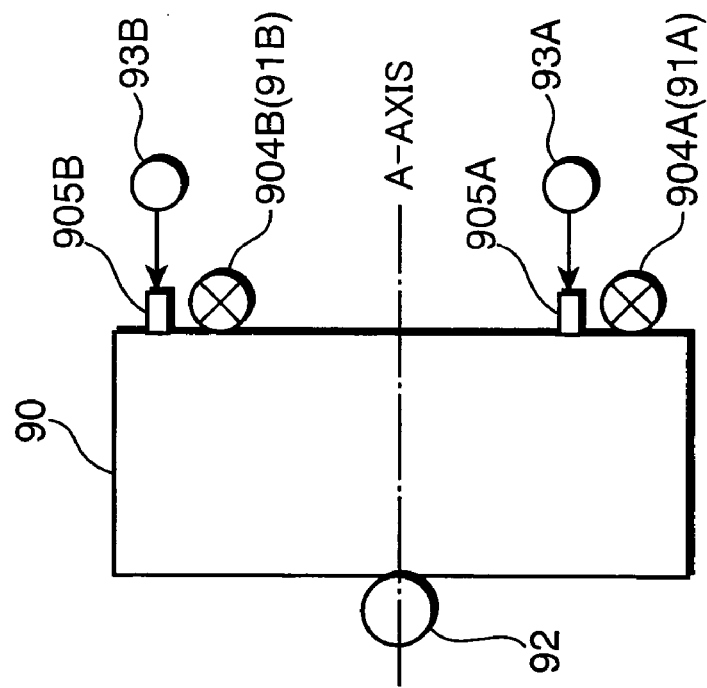
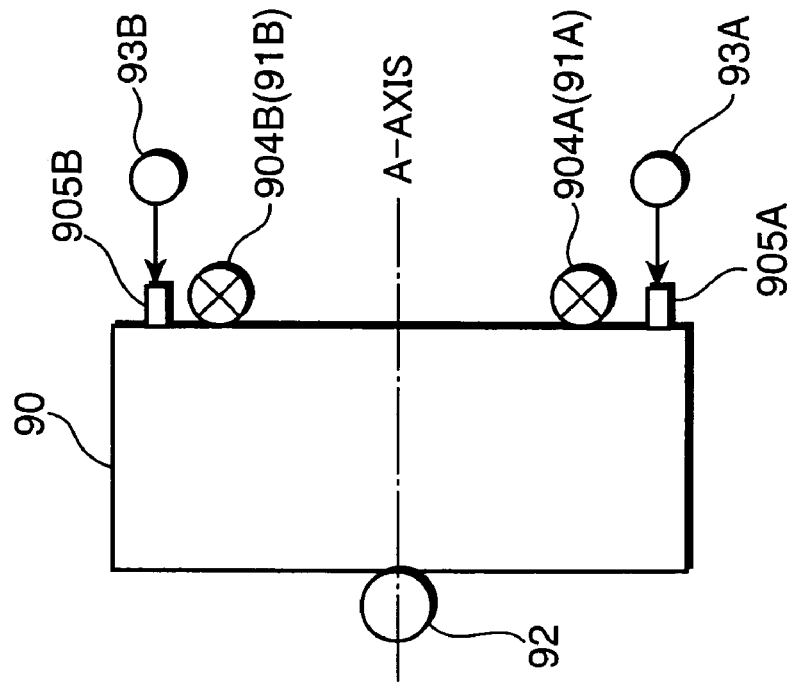
FIG.6A
FIG.6B

ROTATING DEVICE, BARREL UNIT, IMAGE SENSING APPARATUS INSTALLED WITH THE SAME

This application is based on patent application No. 2005-180137 filed in Japan, the contents of which are hereby incorporated by references.

BACKGROUND OF THE INVENTION

1. Field of the Invention

This invention relates to a rotating device suitable as a means for returning a drivable element to an original position, particularly to a barrel unit built in an electronic camera, a camera-fitted mobile phone or the like and capable of a shake correction against a camera shake, and an image sensing apparatus installed with such a barrel unit.

2. Description of the Related Art

In electronic cameras and the like, various shake correcting mechanisms have been adopted to suppress the disturbance of a photographed image due to the hand shake of a user. A so-called gimbal mechanism for rotatably supporting the entire barrel has been conventionally known as a shake correcting mechanism (see, for example, Japanese Unexamined Patent Publication No. H07-274056). Further, there has been also known a method for shifting a shake correcting lens disposed inside a barrel in such a direction as to cancel out the shake acting on a camera within a plane orthogonal to an optical axis (see, for example, Japanese Unexamined Patent Publication No. H05-107620).

In recent years, the miniaturization of electronic cameras has further advanced and, therefore, a shake correcting mechanism for a photographing optical system incorporated into an originally small digital equipment such as a small-size electronic camera and a camera-fitted mobile phone has been required to have a maximally compact construction. However, it is difficult to make a gimbal mechanism as disclosed in the first publication more compact. Further, the shake correcting lens needs to be miniaturized in the shake correcting mechanism disclosed in the second publication in the case of being installed into a small-size electronic camera or the like. It is difficult to precisely drive such a minute shake correcting lens, which leads to a problem of being difficult to perform a proper shake correction.

On the other hand, the applicant of the present application proposed a shake correcting method according to which an angled barrel for bending an optical axis of an incident light substantially at 90° is used and supported by means of one steel ball (pivot bearing portion) and two actuators, and a shake correction is performed by rotatably driving the entire angled barrel about two axes orthogonal to each other. Unlike the above gimbal mechanism, this shake correcting mechanism can be made considerably more compact.

In the shake correcting mechanism as above, it is necessary to return the barrel to a specified original position (centering) at the time of initial driving (at the time of an power-on operation). During the shake correction drive, it is also preferable to perform a similar centering operation at a suitable timing as a measure against the displacement of the barrel and a measure against a step-out in the case of using stepping motors or the like as actuators. Such a centering operation is desirably completed within as short a period as possible with the object of promptly making transition to the photographing operation. As a position detecting sensor for sensing the original position, a simplest sensing element is desirably used with the object of cost reduction and simplification of the construction of the apparatus. However, it is a reality at present that a rotating device (barrel unit) sufficiently good in terms of high-speed centering and lower cost has not been realized yet.

SUMMARY OF THE INVENTION

It is an object of the present invention to provide a rotating technology which is free from the problems residing in the prior art.

It is another object of the present invention to provide a rotating device, a barrel unit, and an image sensing apparatus which can execute a position detection with a simple construction and a quick centering operation and inexpensive.

According to an aspect of the invention, a rotating device is operable to rotate a drivable element while supporting it at first, second and third points. The drivable element has an arbitrary point located at inner sides of the three supporting points, a first axis which is an axis located on a specified plane including the arbitrary point and passing the arbitrary point, a second axis passing the arbitrary point and orthogonal to the first axis on the plane, and a third axis which is an axis perpendicular to the plane and passing the arbitrary point.

The rotating device is provided with: a first actuator for giving a driving force along a direction parallel with the third axis, the first supporting point being an acting portion of the first actuator; a second actuator for giving a driving force along a direction parallel with the third axis, the second supporting point located at a side of the first or second axis opposite to the first supporting point being an acting portion of the second actuator; a supporting portion provided at the third supporting point to support the drivable element rotatably about a first rotation axis extending in a direction parallel with the first axis and/or a second rotation axis extending in a direction parallel with the second axis by the driving forces given by the first and second actuators; a first position detector located on or near a line connecting the acting portions of the first and second actuators, and including a detecting portion near the acting portion of the first actuator and adapted to detect the rotational posture of the drivable element; and a second position detector located on or near the line connecting the acting portions of the first and second actuators, and including a detecting portion near the acting portion of the second actuator and adapted to detect the rotational posture of the drivable element.

These and other objects, features, aspects and advantages of the present invention will become more apparent upon a reading of the following detailed description and accompanying drawings.

BRIEF DESCRIPTION OF THE DRAWINGS

FIGS. 4A to 4D are diagrams successively showing a process of returning a displaced drivable element to an original position;

FIGS. 6A and 6B are diagrams showing variations of arranged positions of detecting portions of first and second position detecting sensors;

DETAILED DESCRIPTION OF THE PREFERRED EMBODIMENTS OF THE INVENTION

Hereinafter, embodiments of the present invention are described with reference to the accompanying drawings.

Description of One Embodiment as a Rotating Device

Figure 1:
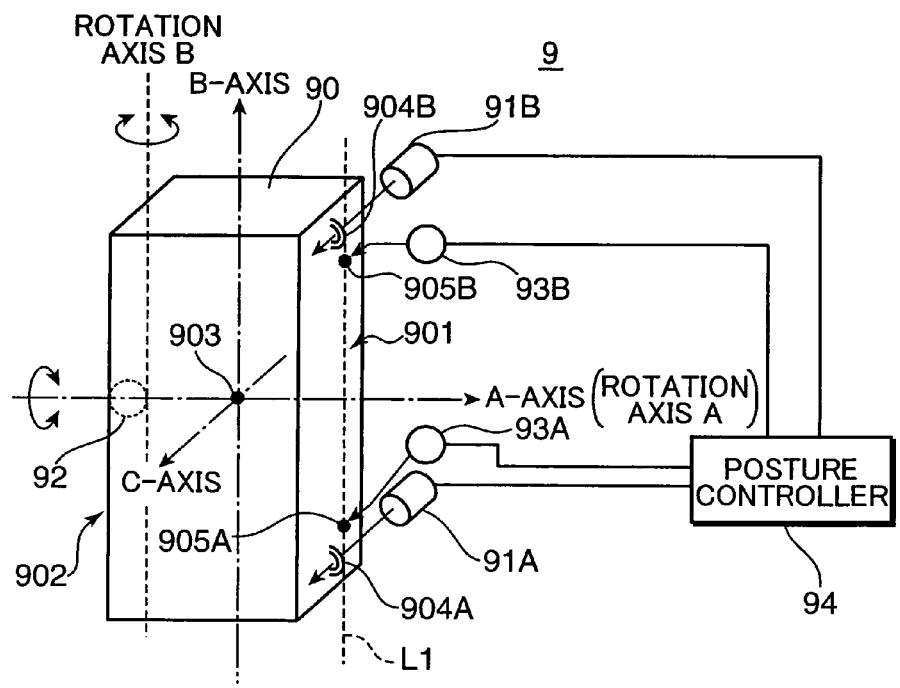
FIG. 1 is a construction diagram schematically showing a construction of a rotating device according to an embodiment of the invention.

FIG. 1 is a construction diagram schematically showing the construction of a rotating device 9 according to one embodiment of the invention. This rotating device 9 is for rotating a vertically long drivable element 90 about specified two axes (rotation axis A, rotation axis B) and provided with first and second actuators 91A, 91B for giving rotational forces to the drivable element 90, a pivot bearing portion (steel ball 92) which serves as a rotation supporting point of the drivable element 90, first and second position detecting sensors 93A (first position detector), 93B (second position detector) for detecting the rotational posture of the drivable element 90, and a posture controller 94.

The drivable element 90 is an arbitrary article, component, structure or the like to be rotated and there is no particular limit in its kind, its application, etc. Although the drivable element 90 has a vertically long rectangular parallelepipedic shape in this shown example, it may, of course, have a cubic, cylindrical or pyramidal shape. The drivable element 90 has a first side surface 901 extending along vertical direction and a second side surface 902 opposed in parallel to the first side surface 901. First and second acting portions 904A, 904B for receiving driving forces given from the first and second actuators 91A, 91B are provided near the upper and bottom ends of the first side surface 901. The first and second acting portions 904A, 904B include movable-piece bearing portions (nut bearing portions, etc.) which are so assembled as to interfere with movable pieces (nuts, etc.), for example, provided in the first and second actuators 91A, 91B. On the other hand, a steel-ball bearing portion (not shown) for the steel ball 92 serving as the pivot bearing portion is provided near the center of the second side surface 902.

This drivable element 90 is supported on an unillustrated suitable supporting board (fixed board) substantially by three supporting points. Two of these supporting points are by the first and second acting portions 904A, 904B of the first and second actuators 91A, 91B, and the remaining one supporting point is a pivot supporting point by the steel ball 92. These three supporting points are so arranged as to enclose an arbitrary point 903 (e.g., center of gravity of the drivable element 90) in the drivable element 90.

More specifically, if it is defined that an axis located in a specified plane including the arbitrary point 903 and passing the arbitrary point 903 is an A-axis (first axis), the one orthogonal to the A-axis in this plane is a B-axis (second axis) and the one orthogonal to this plane and passing the arbitrary point 903 is a C-axis (third axis), the first and second acting portions 904A, 90B of the first and second actuators 91A, 91B which are two supporting points for supporting the drivable element 90 are substantially symmetrically arranged on the first side surface 901 with respect to the A-axis, and the ball bearing portion for the steel ball 92 which is the remaining supporting point is arranged on the A-axis on the second side surface 902. It should be noted that the first and second actuators 91A, 91B are mounted on the above supporting board and the steel ball 92 is so assembled as to be tightly held between the other ball bearing portion provided on the supporting board and the steel-ball bearing portion in the drivable element 90.

The first and second actuators 91A, 91B are linear actuators including, for example, stepping motors and adapted to produce linear driving forces. The linear driving forces from the first and second actuators 91A, 91B are given to the first and second acting portions 904A, 904B along a direction of the C-axis. In this way, the drivable element 90 is made rotatable about the rotation axis A extending along a direction of the A-axis (first rotation axis: the A-axis is the same as the rotation axis A in this case) and/or the rotation axis B extending along a direction of the B-axis (second rotation axis: axis passing the supporting point by the steel ball 92 and orthogonal to the rotation axis A) with respect to the unillustrated supporting board or the like. In this construction, the drivable element 90 is also pivotal about the C-axis, but such pivotal movements about the C-axis are restricted by an unillustrated movement restraining mechanism.

In addition to the above construction, the rotating device 9 of this embodiment is also provided with a position detecting mechanism for detecting the rotational posture of the drivable element 90 in order to return the drivable element 90 to its original position or to position the drivable element 90 to a specified rotational position. Specifically, a detecting portion 905A of the first position detecting sensor 93A for detecting the rotational posture of the drivable element 90 is arranged on (or near) a straight line L1 connecting the first and second acting portions 904A, 904B of the first and second actuators 91a, 91B and near a side of the acting portion 904A of the first actuator 91A toward the A-axis, whereas a detecting portion 905B of the second position detecting sensor 93B for similarly detecting the rotational posture of the drivable element 90 is arranged on the straight line L1 and near a side of the acting portion 904B of the second actuator 91B toward the A-axis.

Although two-dimensional PSDs (position sensitive detectors), two-dimensional Hall sensors or like advanced position sensors may be used as the first and second position detecting sensors 93A, 93B, it is desirable to construct them by switcher such as mechanical switches provided with mechanical contacts in the case of the contact type or photointerrupter sensors (PI sensors) comprised of a photointerrupter and a light blocking blade or reflection type sensors comprised of a light emitting element and a reflecting member in the case of the non-contact type. By using such switcher as the first and second position detecting sensors 93A, 93B, the construction for detecting the position of the drivable element 90 can be simplified, which leads to cost reduction.

The detecting portions 905A, 905B are provided with members corresponding to the position detecting sensors to be installed. For example, if the position detecting sensors are two-dimensional PSDs, light emitting elements or PSD elements are mounted on the detecting portions 905A, 905B. On the other hand, in the case of the switcher, projecting pieces to interfere with mechanical contacts if the switcher are mechanical switches; light blocking blades if the switcher are PI sensors; or reflecting members if the switcher are reflection type sensors, are provided on the detecting portions 905A, 905B. These serve as specified position detecting points set on an outer surface of the drivable element 90, and the position of the drivable element 90 is detected with the position detecting points as reference positions (original positions).

Figure 2:
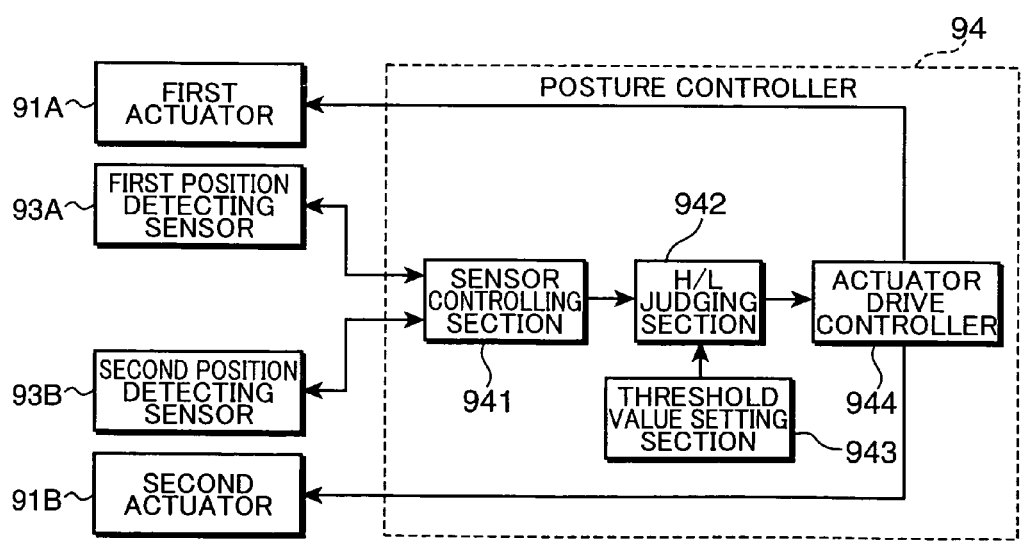
FIG. 2 is a block diagram showing a functional construction of a posture controller of the rotating device.

The posture controller 94 includes a CPU (central processing unit) and the like, and controls the posture of the drivable element 90 by driving the first and second actuators 91A, 91B based on the position detection result of the drivable element 90 by the first and second position detecting sensors 93A, 93B. FIG. 2 is a block diagram showing a functional construction of the posture controller 94. This posture controller 94 includes a sensor controller 941, a H/L judging section 942, a threshold value setting section 943 and an actuator drive controller 944. Here is described a case where PI sensors (switcher) each provided with a light emitting element and a light receiving element and light blocking blades (position detecting points) for blocking a light path between the light emitting and receiving elements are used as the first and second position detecting sensors 93A, 93B.

Figure 3A:
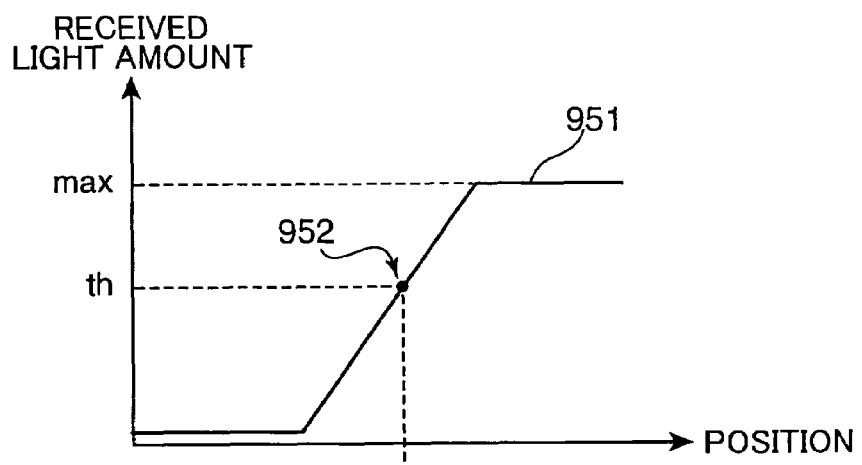
FIGS. 3A and 3B are graphs showing the operation of a position detecting sensor.

The sensor controller 941 causes the first and second position detecting sensors 93A, 93B to perform sensing operations and receives signals relating to position information obtained by the sensing operations. In this case, the light emitting elements provided in the PI sensors are turned on continuously or intermittently at specified timings, and electrical signals obtained by photoelectrically converting lights received by the light receiving elements are received as the signals relating to the position information. The electrical signals indicate a photoelectric conversion characteristic 951 in relation to a received light amount as shown in FIG. 3A. Specifically, the received light amount is small when the light path between the light emitting and receiving elements is blocked by the light blocking blade (this state serves, for example, as the original position), is gradually increased as the light-blocked state by the light blocking blade comes to be canceled as the drivable element 90 is rotated and reaches its maximum (max) when the light-blocked state is completely canceled.

Figure 3B:
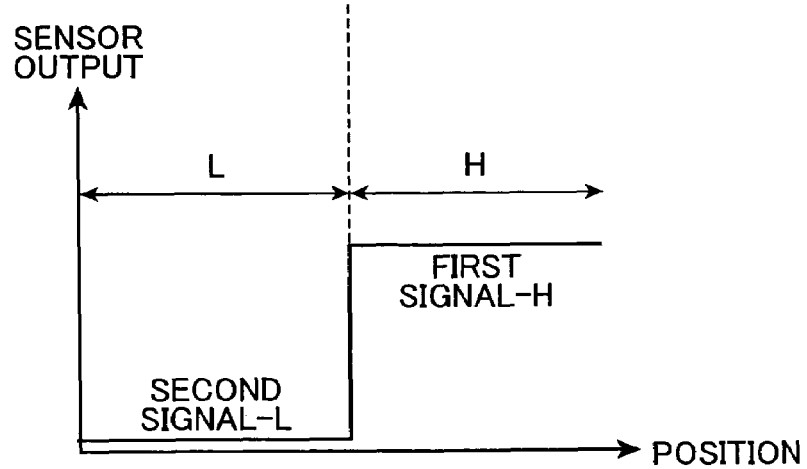

The H/L judging section 942 judges whether output values from the first and second position detecting sensors 93A, 93B are low output states "L" lower than a specified threshold value th or high output states "H" higher than the threshold value th in accordance with the photoelectric conversion characteristic 951 shown in FIG. 3A as shown in FIG. 3B using the threshold value th set beforehand. More specifically, a first signal H is generated in the case of the high output state "H" while a second signal L is generated in the case of the low output state "L" using an output value 952 corresponding to the threshold value th determined on an inclined part of the photoelectric conversion characteristic 951 as a reference. In this way, the output values of the first and second position detecting sensors 93A, 93B are outputted while being converted into the first and second signals H and L which change upon detecting the position detecting point (specified partially light-blocked state by the light blocking blade).

The threshold setting section 943 is a function section for receiving the setting relating to the output value 952 corresponding to the threshold value th in the inclined part of the photoelectric conversion characteristic 951. The H/L judging section 942 reads the threshold value set in the threshold value setting section 943 and makes the aforementioned judgment of "H" or "L".

The actuator drive controller 944 executes a control to bring the posture of the drivable element 90 to a specified position by causing the first and second actuators 91A, 91B to operate with reference to the signals outputted from the H/L judging section 942 (first signal H and second signal L). Specifically, first to third operations (1) to (3) below are successively performed.

(1) First Operation

At least one of the first and second actuators 91A, 91B is caused to operate such that the first signals H or the second signals L are outputted from both of the first and second position detecting sensors 93A, 93B.

(2) Second Operation

At least one of the first and second actuators 91A, 91B is caused to operate such that the second signal L or the first signal H is outputted from either one of the first and second actuators 91A, 91B.

(3) Third Operation

The drivable element 90 is rotated about the disposed position of the detecting portion 905A, 905B from which the second signal L or the first signal H is outputted during the second operation (disposed position of the light blocking blade) or a position proximate thereto, and the first and second actuators 91A, 91B are caused to operate such that the first signals H or the second signals L are outputted from both of the first and second position detecting sensors 93A, 93B.

Figure 5:
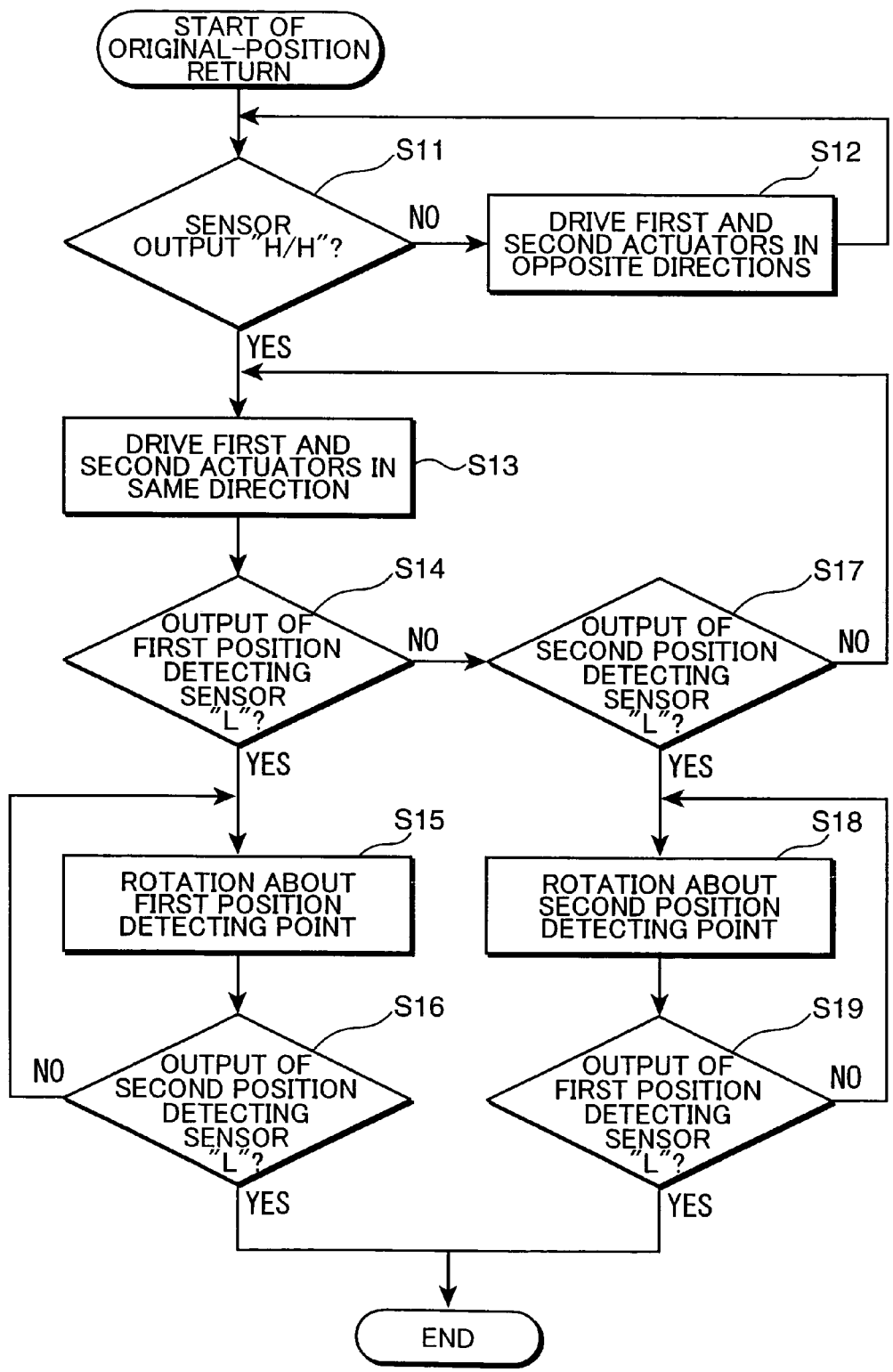
FIG. 5 is a flowchart showing a returning operation to the original position by the posture controller.

The operation of the rotating device 9 constructed as above is described. Here is described the operation in the case of returning the displaced drivable element 90 to the original position assuming that the output values based on the detection signals of the first and second position detecting sensors 93A, 93B are both "L" (second signal L) (point switched to a specified partially light-blocked state) at the original position of the drivable element 90. FIGS. 4A to 4D are diagrams showing the operation of returning the displaced drivable element 90 to the original position, and FIG. 5 is a flowchart showing the returning operation to the original position by the posture controller 94. The operation is described below in accordance with the flowchart of FIG. 5 while successively referring to the process shown in FIGS. 4A to 4D.

The returning operation to the original position is performed, for example, at the time of turning on devices and the like for actuating the drivable element 90 or at the time of centering periodically performed during the operations of the devices and the like. Upon the start of the returning operation to the original position, whether or not the outputs of the first and second position detecting sensors 93A, 93B are both first signals H (written as H/H in FIG. 5) is confirmed (Step S11).

If the rotational position of the drivable element 90 immediately before the start of the returning operation to the original position is such that the output of the first position detecting sensor 93A is the second signal L and that of the second position detecting sensor 93B is the first signal H (L/H state; NO in Step S11) as shown in FIG. 4A, the actuator drive controller 944 causes the first and second actuators 91A, 91B to drive in opposite directions as the aforementioned first operation (Step S12). Specifically, when a second line L2 connecting sensing areas 906A, 906B (light emitting/receiving areas in the case of the PI sensors) of the first and second position detecting sensors 93A, 93B fixed to the suitable supporting board is inclined while crossing a first line L1 connecting the disposed positions of the detecting portions 905A, 905B (disposed positions of the light blocking blades), a driving force in "+" direction is given from the first actuator 91A to the first acting portion 904A while a driving force in "−" direction is given from the second actuator 91B to the second acting portion 904B as shown by arrows in FIG. 4A.

The actuator drive controller 944 suitably controls driving amounts with reference to the signals (first and second signals H, L) outputted from the H/L judging section 942 while driving the first and second actuators 91A, 91B as above (such a driving force as to move a long distance is not given to the second acting portion 904B in the state of FIG. 4A), thereby rotating the drivable element 90 so as to attain the H/H state where the first signals H are outputted from both of the first and second position detecting sensors 93A, 93B as shown in FIG. 4B.

If the sensor outputs show the H/H state in this way (YES in Step S11), the actuator drive controller 944 drives the first and second actuators 91A, 91B as the aforementioned second operation to give driving forces of "−" direction to both first and second acting portions 904A, 904B as shown by arrows in FIG. 4B (Step S13). At this time, driving speeds by the first and second actuators 91A, 91B are the same. In other words, the drivable element 90 is driven in the same direction at the same speed by the two actuators.

Whether or not the second signal L is outputted from the first position detecting sensor 93A is confirmed during the drive (second operation) in Step S13 (Step S14). Upon reaching a state where the second signal L is outputted (YES in Step S14), the first and second actuators 91A, 91B are driven to rotate the drivable element 90 about the disposed position of the detecting portion 905A (first position detecting point) as the aforementioned third operation (Step S15). In this case, the original position is first confirmed by the detecting portion 905A, and the positioning to the original position by the other detecting portion 905B is performed by rotating the drivable element 90 while holding this original position.

During the rotation (third operation) in Step S15, whether or not the second signal L is outputted from the second position detecting sensor 93B is confirmed (Step S16). If the second signal L is outputted (YES in Step S16), the original position is also confirmed by the detecting portion 905B, which means that the drivable element 90 has returned to the original position. As a result, the operation is completed. Unless the second signal L is outputted (NO in Step S16), the rotation of the drivable element 90 in Step S15 is continued.

On the other hand, unless the second signal L is not outputted from the first position detecting sensor 93A (NO in Step S14), whether or not the second signal L is outputted from the second position detecting sensor 93B is confirmed (Step S17). Upon reaching the state where the second signal L is outputted (YES in Step S17), the first and second actuators 91A, 91B are similarly driven to rotate the drivable element 90 about the disposed position of the detecting portion 905B (second position detecting point) as the aforementioned third operation (Step S18). In this case, the original position is first confirmed by the detecting portion 905B, and the positioning to the original position by the other detecting portion 905A is performed by rotating the drivable element 90 while holding this original position.

During the rotation (third operation) in Step S18, whether or not the second signal L is outputted from the first position detecting sensor 93A is confirmed (Step S19). If the second signal L is outputted (YES in Step S19), the original position is also confirmed by the detecting portion 905A, which means that the drivable element 90 has returned to the original position. As a result, the operation is completed. Unless the second signal L is outputted (NO in Step S19), the rotation of the drivable element 90 in Step S18 is continued. It should be noted that the drive (second operation) in Step S13 is continued unless the second signal L is outputted in Step S17 (NO in Step S17).

FIG. 4C shows a state corresponding to Steps S17 to S19. Specifically, as a result of the drive (second operation) in Step S13 from the state of FIG. 4B, the detecting portion 905B and the sensing area 906B first overlap, thereby reaching a H/L state where the output of the first position detecting sensor 93A is the first signal H, but the output of the second position detecting sensor 93B is the second signal L. In this state, the first and second lines L1, L2 cross at the detecting portion 905B.

Thereafter, the operations of the first and second actuators 91A, 91B move onto the third-operation. Specifically, the drivable element 90 is rotated so that the first line L1 turns relative to the second line L2 about the intersection at the detecting portion 905B. Upon reaching a point where the second signal L is also outputted from the first position detecting sensor 93A as shown in FIG. 4D, the returning operation to the original position is ended assuming that the drivable element 90 has returned to its original position. In this state, an L/L state is reached where the outputs of both first and second position detecting sensors 93A, 93B are the second signals L. The first and second lines L1, L2 overlap each other.

In the rotating device 9 described above, it is sufficient for the disposed positions of the detecting portions 905A, 905B (disposed positions of the light blocking blades) of the first and second position detecting sensors 93A, 93B to be near the first acting portion 904A of the first actuator 91A and near the second acting portion 904B of the second actuator 91B. Accordingly, the detecting portions 905A, 905B may be arranged at the outer sides of and in proximity to the first and second acting portions 904A, 904B as shown in FIG. 6A although they are arranged at the sides (inner sides) of the first and second acting portions 904A, 905B toward the A-axis in the above embodiment. Alternatively, the detecting portion 905A may be arranged at the inner side of and in proximity to the first acting portion 904A while the detecting portion 905B may be arranged at the outer side of and in proximity to the second acting portion 904B as shown in FIG. 6B.

Although two of the three supporting points substantially supporting the drivable element 90 are supporting points by the acting portions of the actuators in this embodiment, all the three supporting points may be those by the acting portions of the actuators. Although the H/H state is reached by the aforementioned first operation, the H/L state is reached by the aforementioned second operation and the L/L state is reached by the aforementioned third operation in the above example (see FIGS. 4B to 4D), the first and second actuators 91A, 91B may be conversely driven such that the L/L state is reached by the first operation, the L/H state is reached by the second operation and the H/H state is reached by the third operation.

According to the rotating device 9 of this embodiment, the position of the drivable element 90 rotated about the A-axis and the B-axis can be precisely detected with a simple construction. Specifically, displacements (from the original position) about both the rotation axis A and the rotation axis B can be detected only by the two position detecting sensors by arranging the detecting portions 905A, 905B of the first and second position detecting sensors 93A, 93B on or near the first line L1 connecting the first and second acting portions 904A, 904B of the first and second actuators 91A, 91B. Further, since the detecting portions 905A, 905B are arranged near the first and second acting portions 904A, 904B, the driving points of the drivable element 90 by the first and second actuators 91A, 91B become closer to the position detecting points and the returning operation to the original position can be quickly performed using such an algorithm as described with reference to FIGS. 4 and 5.

Description of One Embodiment as an Image Sensing Apparatus

A specific embodiment is described in detail by way of an electronic camera having a built-in barrel as one embodiment of an image sensing apparatus provided with a barrel unit (rotating device) according to the present invention with reference to the accompanying drawings.

(Description of the Camera Construction)

Figure 7A:
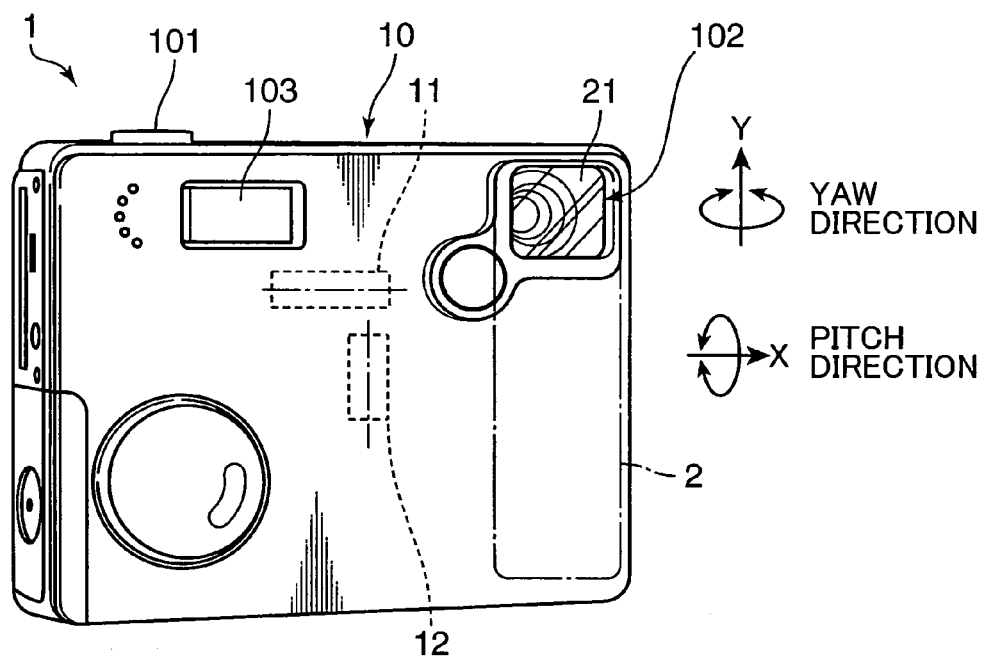
FIGS. 7A and 7B are a front view and a rear view showing an external configuration of an electronic camera according to an embodiment of the invention.
Figure 7B:
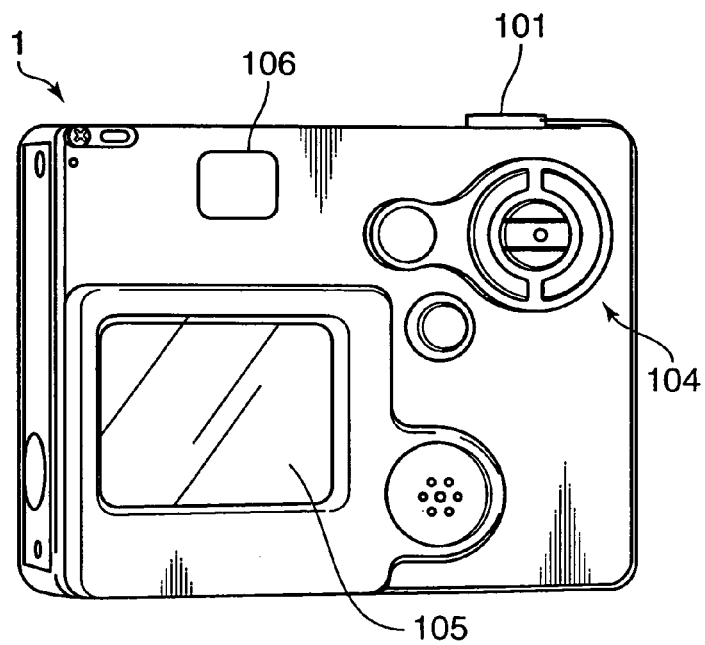

FIGS. 7A and 7B are a front view and a rear view showing the external configuration of an electronic camera 1 according to one embodiment of the invention. In the electronic camera 1 having a built-in barrel, a release button 101 and the like are provided on the top surface of a camera main body 10; a photographing window 102, a flash firing portion 103 and the like are provided on the front surface thereof; and various operation buttons 104, a display 105 including a liquid crystal monitor (LCD), a viewfinder 106 and the like are provided on the rear surface thereof.

An angled barrel 2 (drivable element) constructing a photographing optical system for receiving a subject image from an objective lens 21 through the photographing window 102 and introducing it to a solid-state image sensing device arranged in the main body 10 is incorporated into the main body 10. The length of the angled barrel 2 does not change during zooming and focusing, i.e., does not project out from the main body 10, and the solid-state image sensing device is integrally assembled at a side of its image surface. Further, a pitch-direction (P-direction) shake detecting gyroscope 11 and a yaw-direction (Ya-direction) shake detecting gyroscope 12 as shake detector for detecting an amount of the shake given to the camera 1 are incorporated into the main body 10. The pitch direction and yaw direction are defined as rotating directions about X-axis and Y-axis, respectively, if the horizontal direction (width direction) and vertical direction (height direction) of the camera 1 are referred to as X-axis direction and Y-axis direction.

Figure 8:
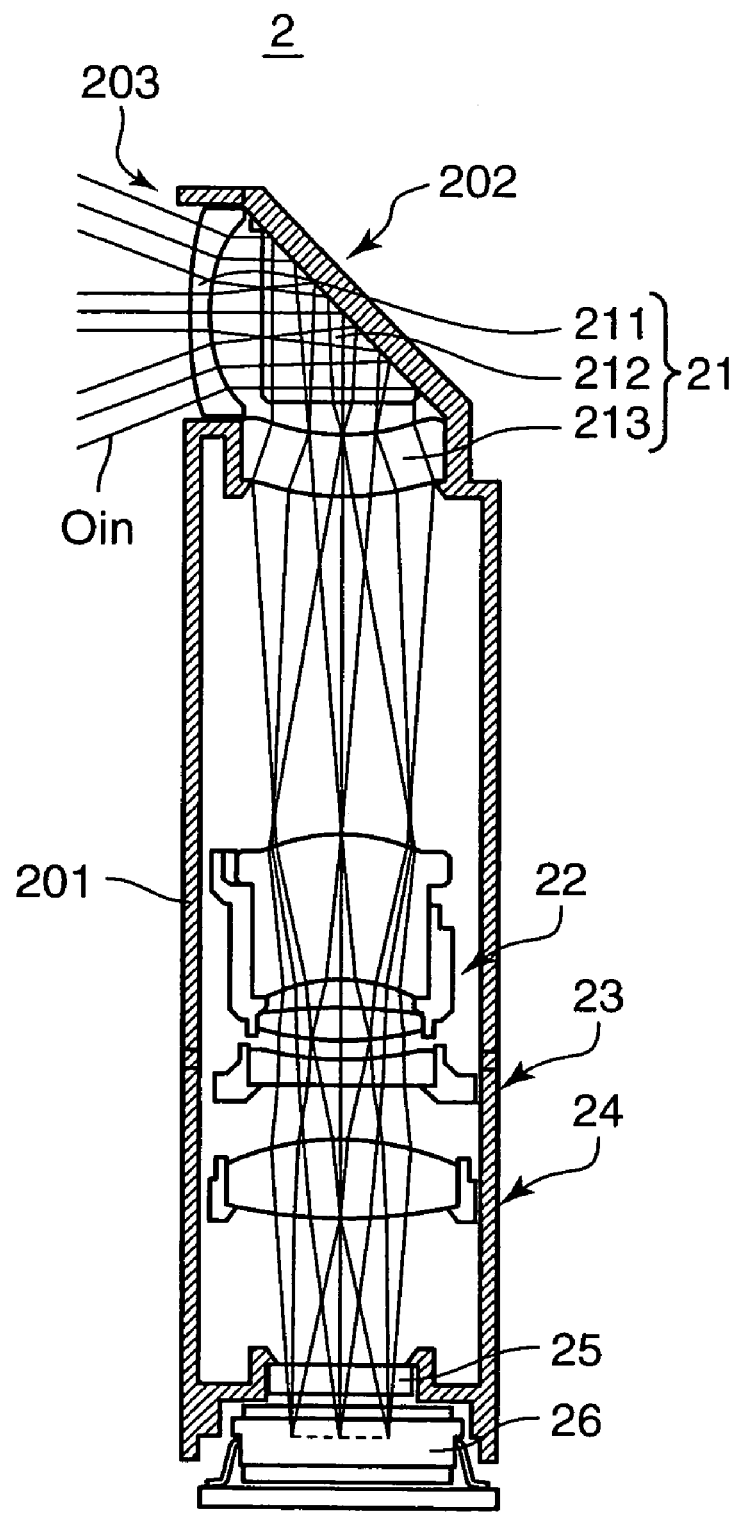
FIG. 8 is a section showing one example of an internal construction of an angled barrel (in a wide-angle operating state)

FIG. 8 is a section showing one example of the internal construction of the angled barrel 2 (in a wide-angle operating state). This angled barrel 2 has a tubular shape that can be vertically or horizontally built in the camera main body 10, and, in its appearance, is comprised of a tubular portion 201 where lens groups are accommodated, and a bent portion 202 arranged in conformity with the position of the photographing window 102 of the camera main body 10 and formed with an aperture 203 for introducing a subject image into the barrel 2.

A first lens 211 fixed to the aperture 203, a prism 212 arranged on the oblique side of the bent portion 202, and the object lens 21 including a second lens 213 arranged at the entrance side of the tubular portion 201 are fixedly disposed in the bent portion 202. A first zoom lens block 22, a fixed lens block 23 and a second zoom lens block 24 are arranged one after another along an optical axis in the tubular portion 201. Further, a solid-state image sensing device 26 such as a CCD is fixed at the exit side of the tubular portion 201 via a low-pass filter 25 for preventing moire. In other words, when the barrel 2 pivots, the solid-state image sensing device 26 pivots together therewith. Thus, a beam Oin (incident light) of the subject image introduced through the aperture 203 is bent at 90° by the prism 212 of the objective lens 21, and is introduced to a light sensing surface of the solid-state image sensing device 26 by way of the first zoom lens block 22, the fixed lens block 23, the second zoom lens block 24 and the low-pass filter 25.

This angled barrel 2 is constructed such that driving forces are given thereto for shake correction by a plurality of actuators to be described later while being incorporated in the main body 10. Specifically, if the vibration of the main body 10 is detected by the pitch-direction shake detecting gyroscope 11 and the yaw-direction shake detecting gyroscope 12, the barrel 2 receives the action of driving forces from the respective actuators in directions along movement axes of the actuators, and is so driven to pivot (rotate) about specified shake correction control axes (for example, in pitch direction and yaw direction) as to cancel out the shake. The arrangement and the like of the actuators are described in detail later.

Figure 9:
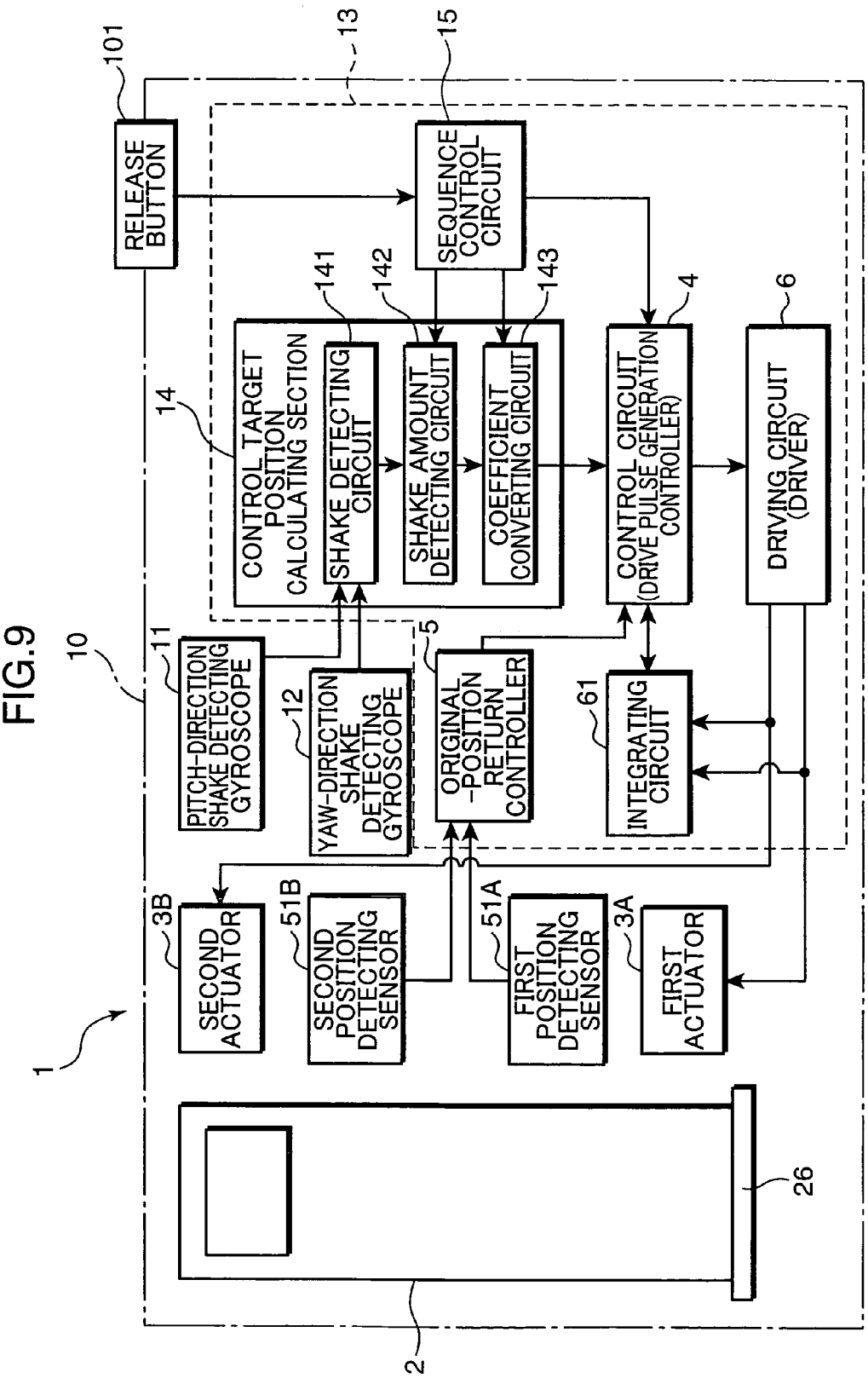
FIG. 9 is a block diagram schematically showing a construction of the electronic camera according to the embodiment only for an essential portion of an electrical construction according to the invention.

FIG. 9 is a block diagram schematically showing the construction of the electronic camera 1 of this embodiment only for an essential portion of the electrical construction according to the present invention. The main body 10 of this electronic camera 1 is internally provided with the release button 101, the pitch-direction shake detecting gyroscope 11 and the yaw-direction detecting gyroscope 12 as the detector for detecting the camera shake or the like acting on the camera 1, a circuit device 13 including various circuit board blocks, the barrel 2 constructing the photographing optical system, a first and a second actuators 3A and 3B including stepping motors for driving the barrel 2 for shake correction, and a first and a second position detecting sensors 51A, 51B for detecting the rotational posture of the barrel 2. The circuit device 13 includes a control target position calculating section 14, a sequence control circuit 15, a control circuit 4, an original-position return controller 5, a driving circuit 6, and an integrating circuit 61. In this example, two actuators are used so as to conform to the embodiment of the barrel unit shown in FIG. 13 to be described later.

The release button 101 is an operation switch a user presses down upon performing a photographing operation. When this release button 101 is pressed halfway, the camera 1 enters a photographing preparation state. In such a photographing preparation state, an automatic focusing (AF) for automatically bringing a subject into focus, an automatic exposure (AE) for automatically determining exposure values, and a shake correcting function for preventing an image disturbance caused by the camera shake act. In order to facilitate the framing, this shake correcting function continues to act while the release button 101 is being pressed down. Further, when the user fully presses the release button 101 down, photographing is started. In other words, an exposure control is so carried out that the solid-state image sensing device is properly exposed in accordance with an exposed state determined by the AE.

The pitch-direction shake detecting gyroscope 11 is a gyroscopic sensor for detecting the shake of the electronic camera 1 along pitch direction (see FIG. 7). The yaw-direction shake detecting gyroscope 12 is a gyroscopic sensor for detecting the shake of the electronic camera 1 along yaw direction. The gyroscopic sensors used here are for detecting an angular velocity of the shake in the case that a measurement object (camera main body 10 in this embodiment) is rotated by the shake. Such gyroscopic sensors may be constructed such that a voltage is applied, for example, to a piezoelectric device to bring it into an oscillating state, and a distortion resulting from a Coriolis force created when an angular velocity by the rotary motion acts on this piezoelectric device is extracted as an electrical signal to detect the angular velocity.

The control target position calculating section 14 generates control target information set in specified sampling cycles. More specifically, the control target position calculating section 14 receives a pitch-direction shake angular velocity signal detected by the pitch-direction shake detecting gyroscope 11 and a yaw-direction shake angular velocity signal detected by the yaw-direction shake detecting gyroscope 12, and sets a control target value for a servo control (in this case, position information of the barrel 2 as an object to be driven). The control target position calculating section 14 includes a shake detecting circuit 141, a shake amount detecting circuit 142 and a coefficient converting circuit 143.

The shake detecting circuit 141 includes processing circuits such as filter circuits (low-pass filter and high-pass filter) for reducing noise and drift from the angular velocity signals detected by the pitch-direction shake detecting gyroscope 11 and the yaw-direction shake detecting gyroscope 12, and amplifying circuits for amplifying the angular velocity signals. The angular velocity signals after being processed by these processing circuits are inputted to the shake amount detecting circuit 142.

The shake amount detecting circuit 142 receives the detected angular velocity signals at specified intervals of time and applies integration thereto, whereby these angular velocity signals are outputted to the coefficient converting circuit 143 as an angle signal $\theta x$ representing a shake amount of the electronic camera 1 in X-axis direction, and an angle signal $\theta y$ representing a shake amount of the electronic camera 1 in Y-axis direction.

The coefficient converting circuit 143 converts the shake amounts (angle signals $\theta x$, $\theta y$) in the respective directions outputted from the shake amount detecting circuit 142 into movement amounts (px, py) in the respective directions, i.e., movement amounts (target values for positioning) by which the barrel 2 should be moved about the shake correction control axes by means of the first and second actuators 3A, 3B. These target values for positioning are calculated by multiplying angles of rotation ($\theta x$, $\theta y$) about the respective shake correction control axes (first, second control axes) corresponding to shake detection axes along pitch direction and yaw direction by distances between the first or second control axis to points of application of the first and second actuators 3A, 3B on the barrel 2. Signals representing the movement amounts (px, py) in the respective directions outputted from the coefficient converting circuit 143 are inputted to the control circuit 4.

The control circuit 4 (drive pulse generation controller) controls the generation of drive pulses for driving the first and second actuators 3A, 3B constructed by stepping motors. The control circuit 4 converts the signals representing the movement amounts (px, py) in the respective directions into actual drive pulse signals in view of the position information from the integrating circuit 61 to be described later and the operation characteristics and the like of the first and second actuators 3A, 3B. Specifically, the control circuit 4 functions as calculating means for calculating generation conditions for drive pulses necessary to pivot the barrel 2 to reach the control target values in order to carry out a shake correction control (servo control) tracking the control target values generated in the control target position calculating section 14 based on the detection signals from the pitch-direction shake detecting gyroscope 11 and the yaw-direction shake detecting gyroscope 12.

The original-position return controller 5 performs such a control as to return the posture of the barrel 2 as a drivable element to the original position (centering control) by causing the first and second actuators 91A, 91B to operate based on the position detection result of the barrel 2 by the first and second position detecting sensors 51A, 51B at the time of a power-on operation or a specified original-position return control such as the centering. Functions of this original-position return controller 5 are described in detail later.

The driving circuit 6 (driver) includes a pulse generating circuit and the like and generates drive pulses for actually driving the first and second actuators 3A, 3B. These drive pulses are generated in accordance with drive pulse generation control signals given from the control circuit 4.

The integrating circuit 61 is provided for the open-loop control of the first and second actuators 3A, 3B; integrates the number of drive pulses generated by the driving circuit 6; generates current position information of the stepping motors, i.e., the pivoting position information of the barrel 2: and outputs the generated information to the control circuit 4.

The operations of the above shake amount detecting circuit 142, coefficient converting circuit 143 and the control circuit 4 are controlled by the sequence control circuit 15. Specifically, when the release button 101 is pressed down, the sequence control circuit 15 controls the shake amount detecting circuit 142 to let it obtain data signals concerning the aforementioned shake amounts (angle signals $\theta x$, $\theta y$) in the respective directions. Subsequently, the sequence control circuit 15 controls the coefficient converting circuit 143 to let it convert the shake amounts in the respective directions into the movement amounts (px, py) in the respective directions. Consequently, the sequence control circuit 15 controls the control circuit 4 to let it calculate a corrective movement amount of the barrel 2 in specified sampling cycles in accordance with the movement amounts in the respective directions. Such operations are repeated at specified intervals of time for an anti-vibration control of the barrel 2 (camera shake correction) until the release button 101 is fully pressed to end the exposure.

A usual small-size stepping motor including a stator core and a rotor core can be used as the stepping motor constructing the first, second actuator 3A, 3B. It is desirable to directly couple an externally threaded rotary shaft to the rotor core and mount a movable piece (nut or the like) on the externally threaded rotary shaft, so that the barrel 2 can be directly driven in an anti-vibratory manner (shown in FIG. 13 and other figures to be described later). Instead of such a rotary stepping motor, a linear stepping motor in which a rotor linearly moves relative to a stator may be used. Instead of such a stepping motor, various actuators capable of producing linear driving forces can be used.

Figure 10:
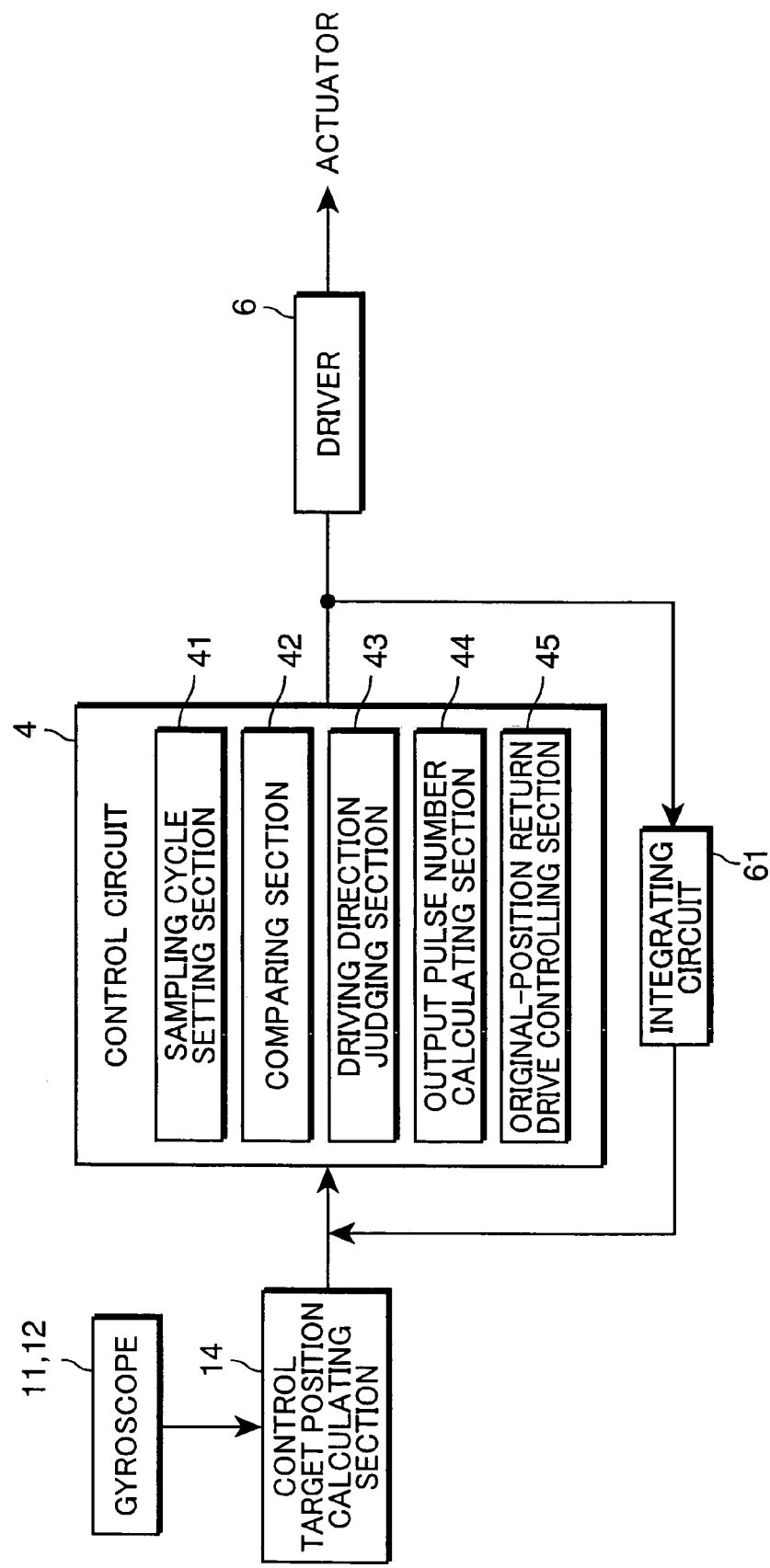
FIG. 10 is a function block diagram showing functions of a control circuit.

FIG. 10 is a function block diagram showing the functions of the control circuit 4. The control circuit 4 has a main function of setting the generation conditions for drive pulses for driving the first and second actuators 3A, 3B in every specified sampling cycle. The control circuit 4 is provided with a sampling cycle setting section 41, a comparing section 42, a driving direction judging section 43 and an output pulse number calculating section 44. The control circuit 4 further includes an original-position return drive controlling section 45 for the original-position returning operation of the barrel 2. This original-position return drive controlling section 45 is described with reference to FIG. 12 later.

The sampling cycle setting section 41 receives the setting of the sampling cycle in which the control target values for the servo control are obtained from the control target position calculating section 14. This sampling cycle may be arbitrarily set and can be suitably selected from, for example, a range of about 0.1 ms to about 2 ms. Generally, if the sampling cycle is set to be short, tracking performance is better since the control target values are obtained in shorter cycles. In view of a processing power and the performance of the stepping motors, suitable sampling cycles may be set.

The comparing section 42 compares the current position information of the rotors of the stepping motors (first and second actuators 3A, 3B), i.e., the pivoting position information of the barrel 2, which is represented by an integral value signal outputted from the aforementioned integrating circuit 61, with the obtained target position information, thereby calculating a position deviation "e" between the current position and the target position information. The barrel 2 is pivoted about the respective shake correction control axes by the first and second actuators 3A, 3B such that this position deviation "e" maximally approaches zero.

The driving direction judging section 43 judges the rotating direction of each stepping motor based on whether the position deviation "e" calculated in the comparing section 42 is positive or negative, and also generates a control signal for rotating the rotor in forward or reverse direction by changing an order of power application to a stator coil based on the judgment result on the rotating direction.

The output pulse number calculating section 44 resets the generation conditions for driving pulses used thus far in every sampling cycle in accordance with the position deviation "e" calculated in the comparing section 42, and carries out such an operation as to determine the generation conditions (numbers of drive pulses) for drive pulses to be generated within a sampling interval to the next sampling cycle. In other words, the output pulse number calculating section 44 calculates the numbers of the drive pulses used to cause the stepping motors to drive the barrel 2 about the respective shake correction control axes based on the movement amounts (px, py) about the shake correction control axes.

Control signals generated by the driving direction judging section 43 and representing the forward or reverse rotation of the rotors, and control signals generated by the output pulse number calculating section 44 and representing the numbers of drive pulses are outputted to the driving circuit 6. Upon receiving such control signals, the driving circuit 6 generates specified drive pulses by means of the pulse generating circuit and gives them to the first and second actuators 3A, 3B to drive the barrel 2.

Figure 11:
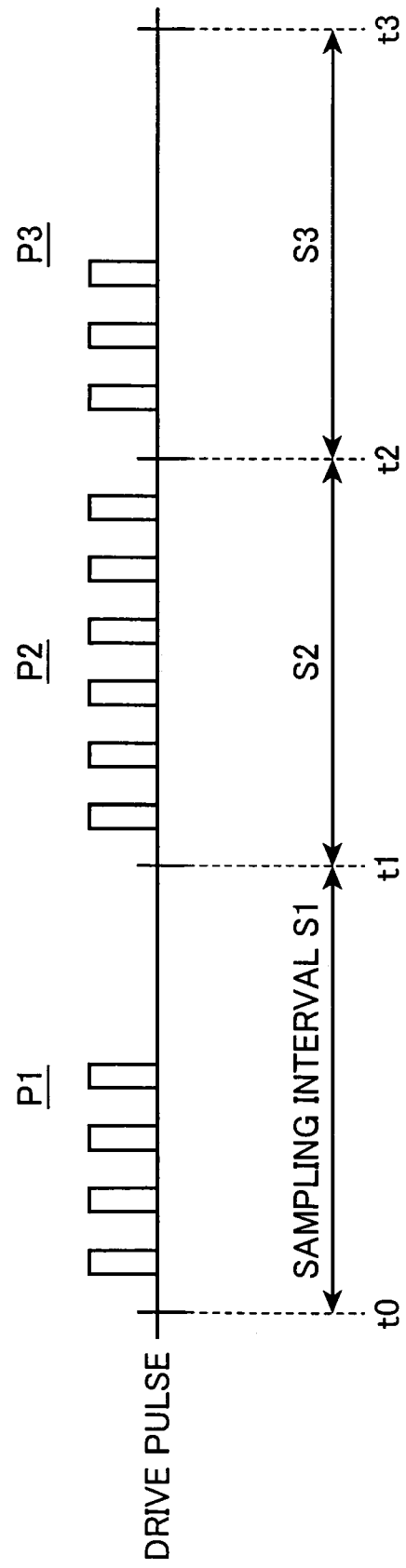
FIG. 11 is a timing chart showing a specific example of a drive pulse generated by the control circuit.

FIG. 11 is a timing chart showing a specific example of drive pulses generated by the control circuit 4. As shown in FIG. 11, drive pulses necessary to drive the barrel 2 for shake correction are outputted within each of specified sampling intervals S1, S2, S3, . . . . The number of the drive pulses to be generated within the sampling interval is determined by a required maximum speed and a positioning resolution. However, a step-out occurs if a drive pulse frequency is extremely high. Thus, such a specified drive pulse frequency as to cause no step-out is selected.

The generation condition for drive pulses is reset in every sampling cycle, and a new generation condition for drive pulses is calculated during each sampling interval. Specifically, if specified drive pulses P1 are outputted during the first sampling interval, a generation condition for the drive pulses P1 is reset upon an arrival of a first sampling timing t1, and a generation condition for drive pulses P2 to be generated during the succeeding second sampling interval S2 is calculated by the control circuit 4. Hereinafter, in a similar manner, the generation condition for the drive pulses P2 is reset at a second sampling timing t2 and a generation condition for drive pulses P3 to be generated during the third sampling interval S3 is calculated. The first and second actuators 3A, 3B are driven by such drive pulses.

Figure 12:
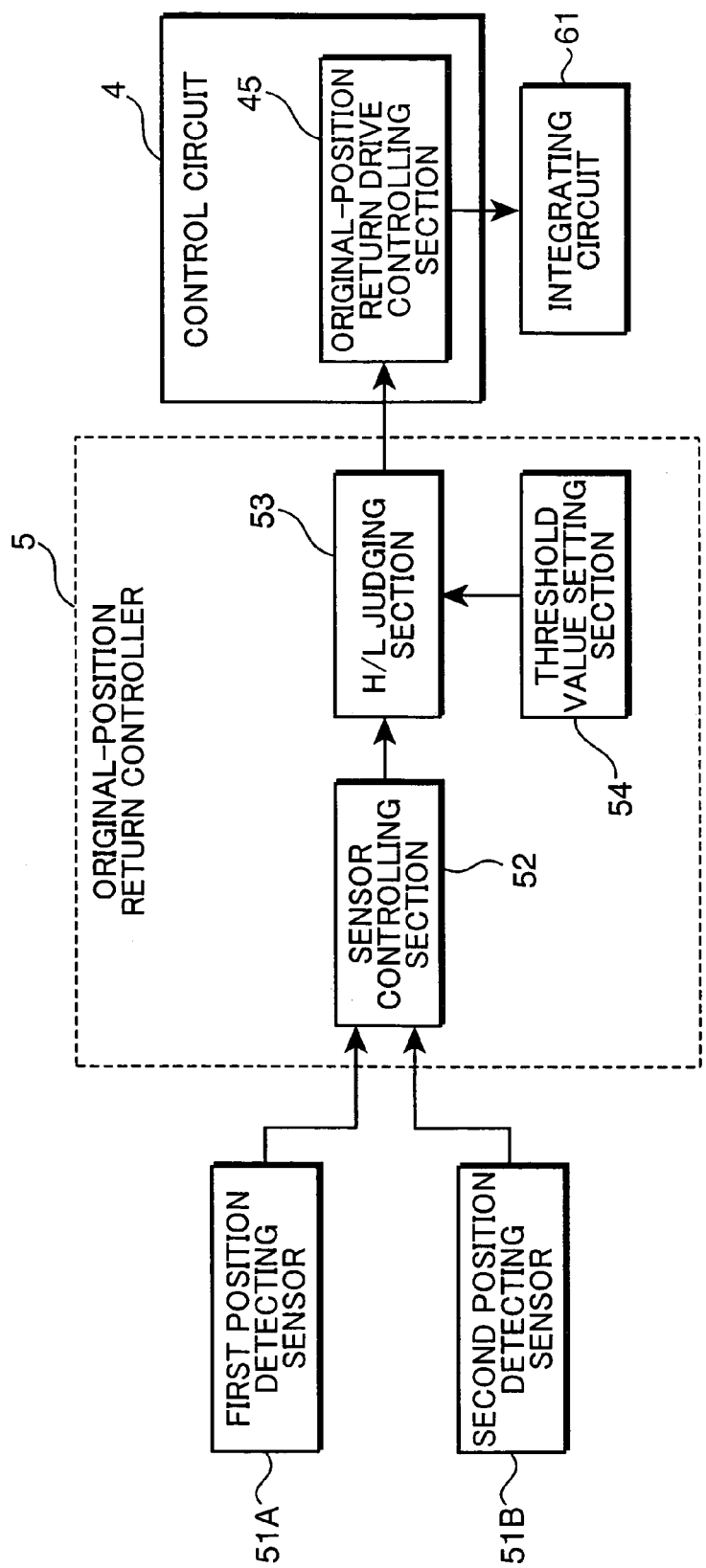
FIG. 12 is a function block diagram showing functions of an original-position return controller, and an original-position return controlling section of the control circuit.

FIG. 12 is a function block diagram showing functions of the original-position return controller 5 and the original-position return drive controlling section 45 of the control circuit 4. The original-position return controller 5 includes a sensor controlling section 52, an H/L judging section 53 and a threshold value setting section 54. Since the original-position return controller 5 has substantially the same functional construction as the posture controller 94 previously shown in FIG. 2, it is only briefly described. Here is also described a case where PI sensors (switcher for performing the operation shown in FIG. 3) each including light emitting and receiving elements and a light blocking blade (position detecting point) for blocking a light path between the light emitting and receiving elements are used as the first and second position detecting sensors 51A, 51B.

The sensor controlling section 52 causes the first and second position detecting sensors 51A, 51B to perform the sensing operations and receives signals relating to position information obtained by the sensing operations. In this case, the light emitting elements provided in the PI sensors are turned on continuously or intermittently at specified timings, and electrical signals obtained by photoelectrically converting lights received by the light receiving elements are received as the signals relating to the position information.

The H/L judging section 53 judges whether output values from the first and second position detecting sensors 51A, 51B are low output states "L" lower than a specified threshold value th or high output states "H" higher than the threshold value th in accordance with the photoelectric conversion characteristic 951 shown in FIG. 3A as shown in FIG. 3B using the threshold value th set beforehand. A first signal H is generated and outputted in the case of the high output state "H" while a second signal L is generated and outputted in the case of the low output state "L". The threshold value setting section 54 is a function section for receiving the setting relating to the output value 952 corresponding to the threshold value th in the inclined part of the photoelectric conversion characteristic 951. The H/L judging section 53 reads the threshold value set in the threshold value setting section 54 and makes the aforementioned judgment of "H" or "L".

The original-position return drive controlling section 45 of the control circuit 4 executes a control to return the barrel 2 to the original position by causing the first and second actuators 3A, 3B to operate with reference to the signals (first signal H and second signal L) outputted from the H/L judging section 53 of the original-position return controller 5. The original-position return drive controlling section 45 also generates a reset signal to reset the count value of the drive pulse number counted in the integrating circuit 61 thus far upon the execution of the original-position returning operation, and causes the integrating circuit 61 to count the drive pulse number anew after the return to the original position.

Specifically, the original-position return drive controlling section 45 causes first to third operations (i) to (iii) below to be successively performed.

(i) First Operation

At least one of the first and second actuators 3A, 3B is caused to operate such that the first signals H or the second signals L are outputted from both of the first and second position detecting sensors 51A, 51B.

(ii) Second Operation

At least one of the first and second actuators 3A, 3B is caused to operate such that the second signal L or the first signal H is outputted from either one of the first and second actuators 3A, 3B.

(iii) Third Operation

The barrel 2 is rotated about the disposed position of the PI sensor from which the second signal L or the first signal H is outputted during the second operation (disposed position of the light blocking blade) or a position proximate thereto, and the first and second actuators 3A, 3B are caused to operate such that the first signals H or the second signals L are outputted from both of the first and second position detecting sensors 51A, 51B.

Specific examples of the first to third operations as above are described in detail later with reference to FIGS. 19 to 24.

Description of Embodiments of the Barrel Unit

Figure 13:
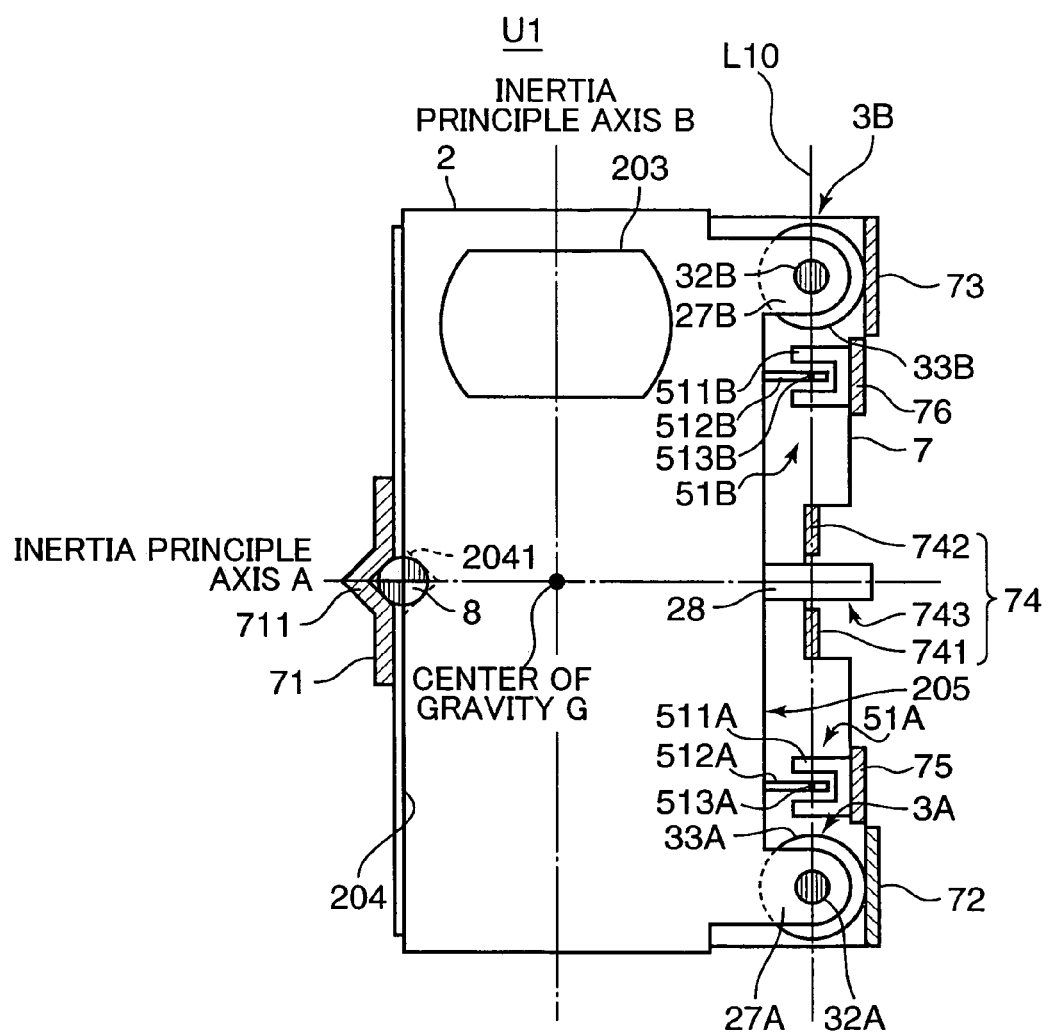
FIG. 13 is a construction diagram schematically showing a construction of a barrel unit according to an embodiment of the invention.
Figure 14:
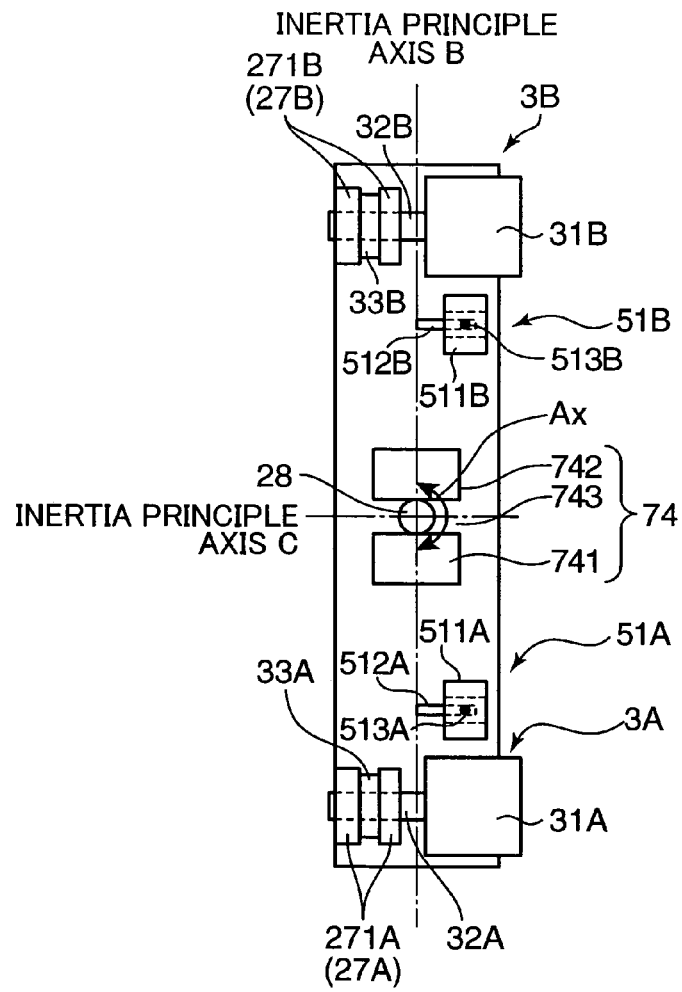
FIG. 14 is a side view of the barrel unit of FIG. 13.
Figure 15:
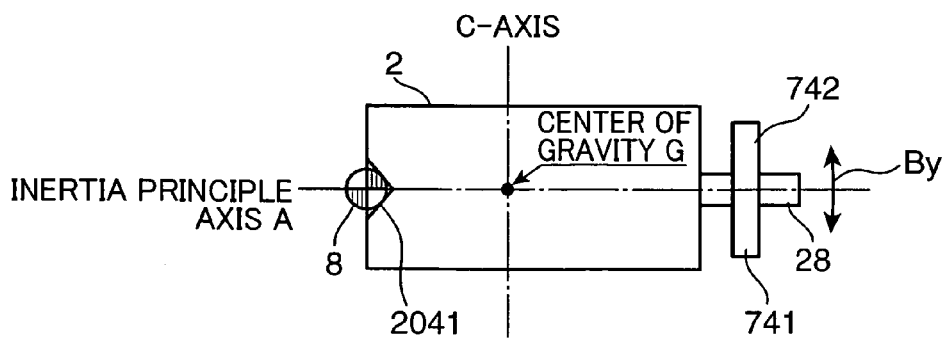
FIG. 15 is a section along an inertia principle axis A of FIG. 13.
Figure 16:
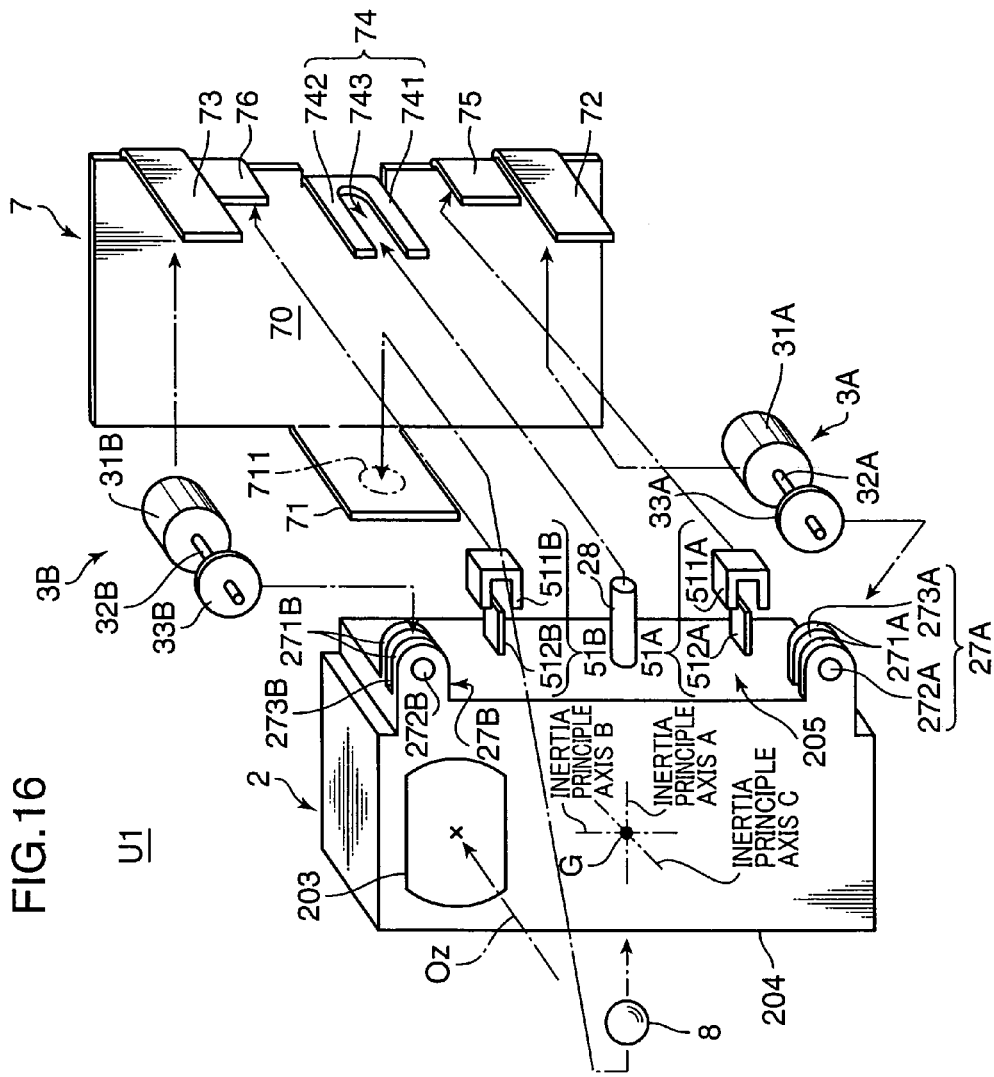
FIG. 16 is an exploded perspective view of the barrel unit.

Embodiments of a barrel unit which is carried in the electronic camera 1 having the basic construction as described above are described. FIG. 13 is a construction diagram schematically showing the construction of a barrel unit U1 according to a first embodiment, FIG. 14 is a side view of the barrel unit U1 of FIG. 13, FIG. 15 is a section of the barrel unit U1 along an inertia principle axis A, and FIG. 16 is an exploded perspective view of this barrel unit U1. It should be noted that a supporting plate 7 is not shown in FIGS. 14 and 15.

This barrel unit U1 is comprised of a barrel 2 having an image sensing device and a zooming optical system (photographing optical system) built therein, the supporting plate 7 for pivotally supporting the barrel 2, a steel ball 8 provided between the barrel 2 and the supporting plate 7 and functioning as a pivot bearing portion, a first and a second actuators 3A, 3B for giving driving forces to the barrel 2 for shake correction, and a first and a second position detecting sensors 51A (first position detector) and 51B (second position detector) for detecting the rotational posture of the barrel 2.

The first actuator 3A is constructed by a stepping motor and includes a motor main body 31A having a magnet or the like built therein, an externally threaded rotary shaft 32A and a disk nut 33A. The nut 33A is spirally engaged with the externally threaded rotary shaft 32A and linearly moves along an extending direction of the externally threaded rotary shaft 32A as the externally threaded rotary shaft 32A turns. In other words, the first actuator 3A is a linear actuator capable of giving a linear driving force along forward and backward directions to a drivable member engaged with the nut 33A. Similarly, the second actuator 3B is a linear actuator including a motor main body 31B having a magnet or the like built therein, an externally threaded rotary shaft 32B and a disk nut 33B and capable of giving a linear driving force along forward and backward directions to a drivable member engaged with the nut 33B.

The barrel 2 is an angled barrel including a container which has a substantially vertically long rectangular shape in front view, having an internal construction as described with reference to FIG. 8, and adapted to bend an optical axis (photographing optical axis Oz) of an incident light introduced through an opening 203 substantially at 90°. A recess 2041 for accommodating a part of the steel ball 8 is formed in the middle of one (first side surface 204) of two vertically long side portions of the barrel 2. Further, a first and a second acting portions 27A, 27B to which the driving forces from the first and second actuators 3A, 3B are given are provided at the opposite upper and bottom ends of the other side portion (second side surface 205).

Here, as shown in FIG. 13, a center of gravity G (arbitrary point) of the barrel 2 is located at such a position that is a middle point with respect to the height direction (vertical direction of FIG. 13) of the barrel 2, but is slightly displaced toward the first side surface 204 with respect to the widthwise direction (transverse direction of FIG. 13) of the barrel 2. In other words, the first side surface 204 of the barrel 2 is relatively closer to the center of gravity G, whereas the second side surface 205 is relatively distant from the center of gravity G. Out of three inertia principle axes passing the center of gravity G, the one orthogonal to the photographing optical axis Oz of the subject light introduced into the barrel 2 and having a relatively large inertia thereabout is defined to be an inertia principle axis A (first axis), the one similarly orthogonal to the photographing optical axis Oz and having an inertia thereabout smaller than the inertia principle axis A is defined to be an inertia principle axis B (second axis), and the one parallel with the photographing optical axis Oz is defined to be an inertia principle axis C (third axis) (see FIG. 16).

The construction of the barrel 2 based on such a definition is described. The first and second side surfaces 204, 205 are surfaces parallel with the inertia principle axis B. The recess 2041 for receiving the steel ball 8 as the pivot bearing portion is formed in the first side surface 204 on the inertia principle axis A. The first and second acting portions 27A, 27B, on which the driving forces given from the first and second actuators 3A, 3B act, are arranged at symmetric positions at the upper and bottom ends of the second side surface 205 with respect to the inertia principle axis A. In this way, the barrel 2 is supported by the first and second acting portions 27A, 27B and the steel ball 8 forming three supporting points which are so arranged as to enclose the center of gravity G. Linear driving forces acting along a direction of the inertia principle axis C are given from the first and second actuators 3A, 3B, which are both linear actuators, to the first and second acting portions 27A, 27B of the barrel 2. As a result, the barrel 2 pivots with the steel ball 8 as a supporting point of rotation as described later.

The first acting portion 27A of the barrel 2 is provided with a pair of nut bearings 271A projecting from the second side surface 205 as shown in FIG. 16. The nut bearings 271A are formed with bearing holes 272A for rotatably supporting the externally threaded rotary shaft 32A of the first actuator 3A. Further, a slit 273A into which the nut 33A is closely fittable is defined between the pair of nut bearings 271A. In other words, the nut 33A is so mounted between the nut bearings 271A as to interfere with each other, and the nut bearings 271A receive forward and backward forces of the nut 33A as the first actuator 3A operates. Similarly, the second acting portion 27B includes a pair of nut bearings 271B, bearing holes 272B and a slit 273B, and the nut bearings 271B receive forward and backward forces of the nut 33B as the first actuator 3B operates.

A guide pin 28 projects from the second side surface 205 of the barrel 2. This guide pin 28 projects along the inertia principle axis A and is engageable with a guide-pin supporting portion 74 of the supporting plate 7 to be described later.

In addition to the above construction, the barrel unit U1 of this embodiment includes a position detecting mechanism for detecting the rotational posture of the barrel 2 in order to return the barrel 2 to the original position (home position). Specifically, the first position detecting sensor 51A is arranged on (or near) a straight line L10 connecting the first and second acting portions 27A, 27B of the first and second actuators 3A, 3B near a side of the acting portion 27A of the first actuator 3A toward the inertia principle axis A, whereas the second position detecting sensor 51B is arranged on (or near) the straight line L10 near a side of the acting portion 27B of the second actuator 3B toward the inertia principle axis A.

The first position detecting sensor 51A is a PI sensor comprised of a PI (photointerrupter) 511A in which a light emitting element and a light receiving element are opposed to each other while defining a specified detection space therebetween, and a light blocking blade 512A (position detecting point) arranged to cross the detection space. The light blocking blade 512A is a flat member projecting near the first acting portion 27A on the second side surface 205 of the barrel 2. The PI 511A is mounted on a first PI supporting portion 75 of the supporting plate 7 to be described later. Accordingly, the light blocking blade 512A moves relative to the PI 511A as the barrel 2 rotates. A first detecting portion 513A is defined on a line connecting the light emitting and receiving elements in the detection space of the PI 511A, and a first signal H or a second signal L is outputted from the first position detecting sensor 51A depending on whether or not the light blocking blade 512A has performed a specified partial light blocking in the first detecting portion 513A (see FIG. 3).

The second position detecting sensor 51B is constructed by a PI sensor similarly including a PI 511B and a light blocking blade 512B. The light blocking blade 512B projects near the second acting portion 27B on the second side surface 205 of the barrel 2, and the PI 511B is mounted on a second PI supporting portion 76 of the supporting plate 7 to be described later. A second detecting portion 513B is defined on a line connecting the light emitting and receiving elements in a detection space of the PI 511B, and the first signal H or the second signal L is outputted from the second position detecting sensor 51B depending on whether or not the light blocking blade 512B has performed a specified partial light blocking in the second detecting portion 513B.

A point where outputs of the first and second position detecting sensors 51A, 51B switch from the first signal H to the second signal L is an original position (PI center) of a position detecting sensor. Since such a PI center and the original position (mechanical center) of the barrel 2 normally do not coincide, the barrel 2 is actually rotated by an adjustment value obtained beforehand to be returned to its original position, for instance, at the time of factory shipment after the Pi center is obtained using the first and second position detecting sensors 51A, 51B.

The supporting plate 7 is made of a metal flat plate to be arranged on the rear side (side opposite to the aperture 203) of the barrel 2, and includes four bent portions arranged in such a manner as to embrace the barrel 2. Specifically, as shown in FIG. 16, the supporting plate 7 is comprised of a flat plate main body 70, a steel-ball supporting portion 71, a first-actuator supporting portion 72, a second-actuator supporting portion 73, the guide-pin supporting portion 74, the first PI supporting portion 75 and the second PI supporting portion 76, the supporting portions 71 to 76 being bent substantially at 90° at the lateral edges of the plate main body 70 located at the opposite widthwise ends.

The steel-ball supporting portion 71 is located at a side of the supporting plate 7 corresponding to the first side surface 204 of the barrel 2, and provided with a confining recess 711 for accommodating a part of the steel ball 8. The barrel 2 and the supporting plate 7 are assembled such that the steel ball 8 is held between this confining recess 711 and the recess 2041 formed in the first side surface 204 of the barrel 2.

On the other hand, the first-actuator supporting portion 72 and the second-actuator supporting portion 73 are so located at the upper and bottom ends as to correspond to the positions of the first and section acting portions 27A, 27B of the barrel 2 at a side of the supporting plate 7 corresponding to the second side surface 205 of the barrel 2. Although detailed structures such as screw holes are neither described nor shown, the first and second actuators 3A, 3B are fixed to the first-actuator supporting portion 72 and the second-actuator supporting portion 73 by suitable fixing mechanisms.

The guide-pin supporting portion 74 is located in the middle so as to face the steel-ball supporting portion 71, likewise at the side of the supporting plate 7 corresponding to the second side surface 205 of the barrel 2. The guide-pin supporting portion 74 includes first and second projecting pieces 741, 742 and a slit 743 defined therebetween. The slit 743 is a straight slit extending in the direction of the inertia principle axis C and having a width substantially equal to the outer diameter of the guide pin 28 of the barrel 2. In other words, the guide pin 28 is fitted into the slit 743. In the slit 743, the guide pin 28 is slidable along the direction of the inertia principle axis C substantially without any resistance and rotatable about the center axis thereof (also about the inertia principle axis A in this case), whereas the outer diameter of the guide pin 28 and the width of the slit 743 are so selected as to cause no substantial shaking movement of the guide pin 28 along a direction of the inertia principle axis B.

The form of the supporting plate 7 can be arbitrarily set, and the steel-ball supporting portion 71, the first-actuator supporting portion 72, the second-actuator supporting portion 73 and the guide-pin supporting portion 74 may be suitably arranged in conformity with the internal construction of the electronic camera 1 into which the barrel unit U1 is incorporated. Further, the first and second actuators 3A, 3B may be installed in the barrel 2.

Figure 17:
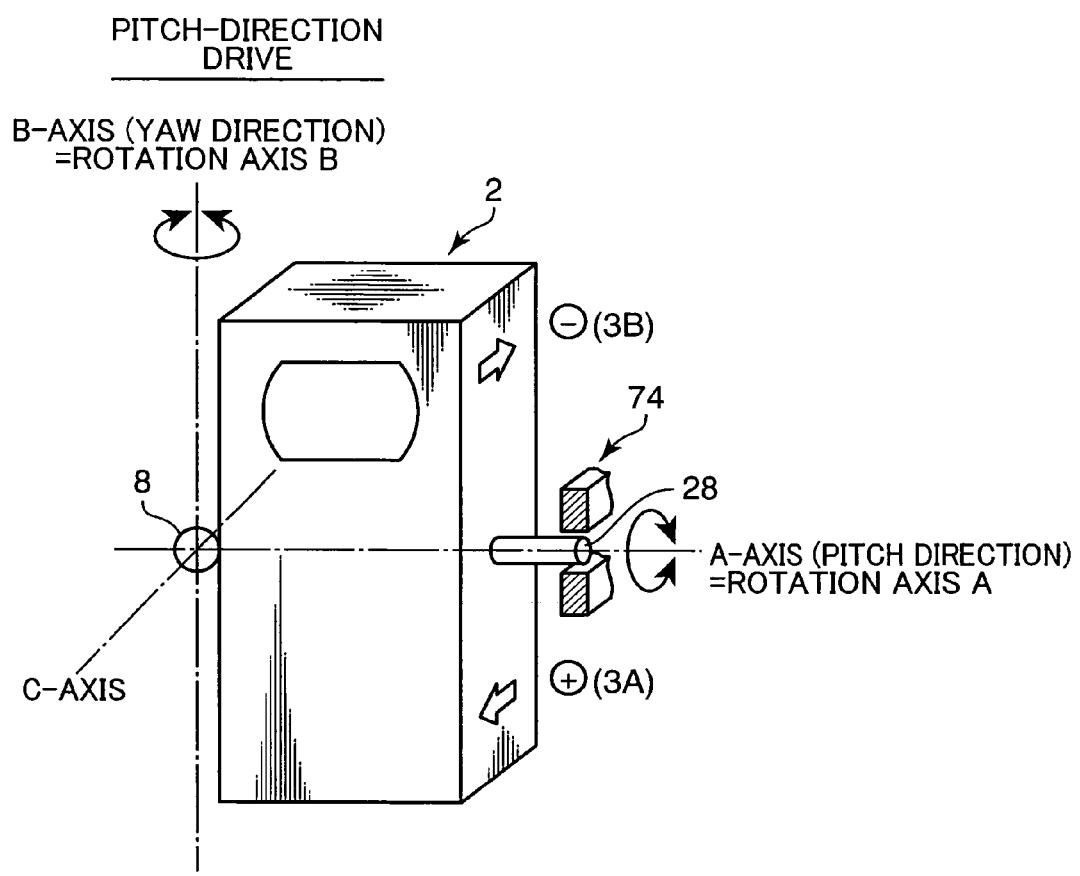
FIG. 17 is a perspective view diagrammatically showing a driven state of a barrel for shake correction in the barrel unit in the case of driving the barrel in pitch direction for shake correction.
Figure 18:
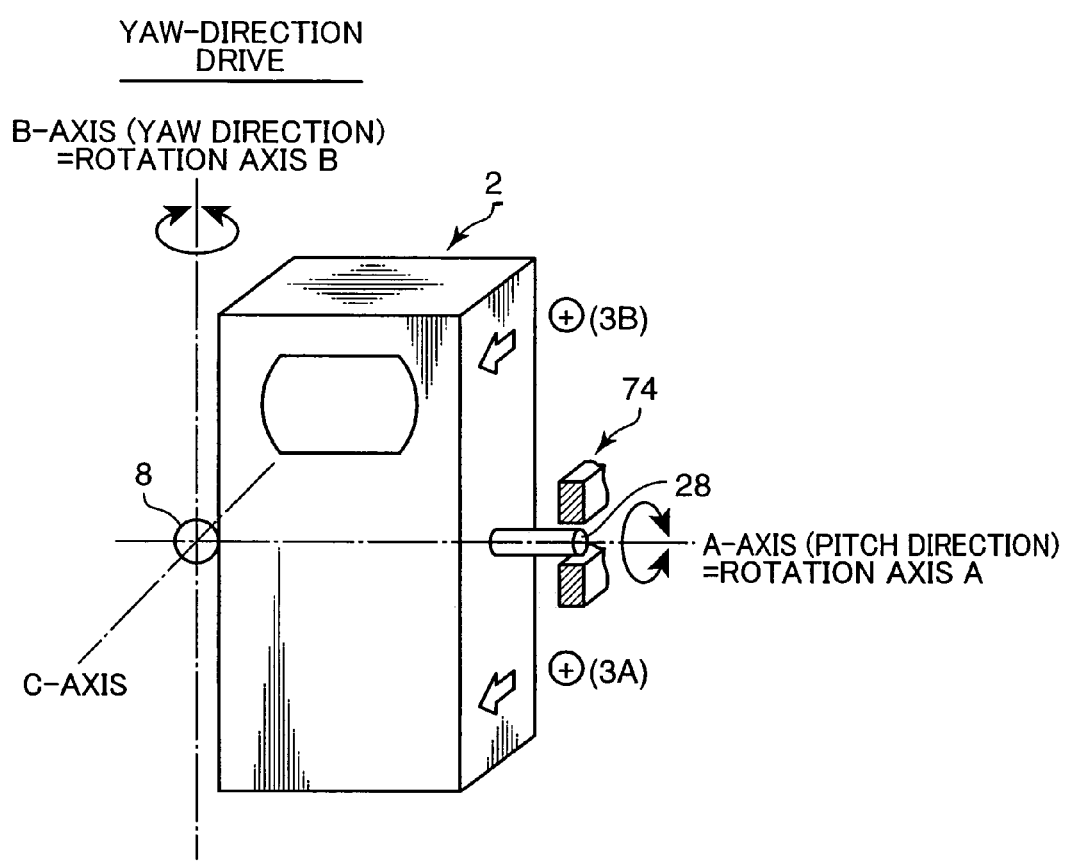
FIG. 18 is a perspective view diagrammatically showing a driven state of a barrel for shake correction in the barrel unit in the case of driving the barrel in yaw direction for shake correction.

The shake correcting operation of the barrel unit U1 constructed as above is described. FIGS. 17 and 18 are diagrammatic perspective views showing driven states of the barrel 2 for shake correction. Since the barrel unit U1 is pivotally supported on the steel ball 8, the supporting point by the steel ball 8 serves as a center of rotation of the barrel 2 and the barrel unit U1 is rotatable along three directions about A-, B-, C-axes, which are three axes passing the supporting point. Here, if the directions defined in FIG. 7 are applied, the A-axis corresponds to an axis of rotation in pitch directions; the B-axis an axis of rotation in yaw directions; and the C-axis an axis of rotation along the direction of the optical axis. Rotation about the C-axis is restricted by a movement constraining mechanism comprised of the guide pin 28 and the guide-pin supporting portion 74. Here, the A-axis substantially coincides with the inertia principle axis A passing the center of gravity G shown in FIG. 16. On the other hand, the B- and C-axes do not coincide with the inertia principle axes B, C since the center of rotation is set outside the barrel 2.

First, a case where the barrel 2 is driven in pitch direction for shake correction is described-with respect to FIG. 17. In the case of driving in pitch direction, the driving directions of the first and second actuators 3A, 3B are opposite to each other as shown in arrows in FIG. 17 in order to pivot the barrel 2 about the A-axis. In other words, the nut 33A of the first actuator 3A is driven forward (+driving), whereas the nut 33B of the second actuator 3B is driven backward (−driving). Alternatively, the nut 33A is driven backward (−driving), whereas the nut 33B is driven forward (+driving). Such driving forces are given to the first and second acting portions 27A, 27B, whereby the barrel 2 is rotated about the A-axis with the supporting point by the steel ball 8 as the center of rotation. At the time of this driving in pitch directions, the guide pin 28 revolves in the slit 743 of the guide-pin supporting portion 74 as shown by arrows Ax in FIG. 14.

Next, in the case of driving in yaw direction, the driving directions of the first actuator 3A and the second actuator 3B are same as shown in FIG. 18. In other words, the nut 33A of the first actuator 3A is driven forward (+driving) and the nut 33B of the second actuator 3B is also driven forward (+driving). Alternatively, the nuts 33A, 33B are both driven backward (−driving). Such driving forces are given to the first and second acting portions 27A, 27B, whereby the barrel 2 is rotated about the B-axis with the supporting point by the steel ball 8 as the center of rotation. At the time of this driving in yaw directions, the guide pin 28 slides in the slit 743 of the guide-pin supporting portion 74 as shown by arrows By in FIG. 15. Strictly speaking, the guide pin 28 moves along an arcuate path centered on the supporting point by the steel ball 8.

According to such a barrel unit U1, the first and second acting portions 27A, 27B that receive the driving forces from the first and second actuators 3A, 3B are arranged on the second side surface 205 relatively distant from the center of gravity G of the barrel 2, substantially most distant from the A-axis and also distant from the B-axis. Thus, inertial loads are substantially minimal and the barrel 2 can be driven for shake correction by means of the actuators having a smaller size and a lower torque (lower power consumption). Further, since the first and second actuators 3A, 3B are arranged at symmetric positions with respect to the A-axis, the barrel 2 can be driven for shake correction by causing them to produce the same driving forces (using the same actuators). Accordingly, the driving forces to be produced from the respective actuators can be substantially minimized, and a driving system having a high dynamic symmetry can be built despite the arrangement of the pivot bearing portion outside the barrel. Therefore, there is an advantage of enabling the barrel 2 to be stably driven for shake correction by eliminating dynamically unstable elements.

Further, since the first and second acting portions 27A, 27B of the first and second actuators 3A, 3B are arranged at positions substantially most distant from the supporting point by the steel ball 8 as the center of rotation, a resolution to move the barrel 2 becomes higher and, as a result, the barrel 2 can be highly precisely driven for shake correction.

Description of the Original-Position Returning Operation of the Barrel

The original-position returning operation of the electronic camera 1 constructed as above is described. Here, description is made on the operation in the case of returning the displaced barrel 2 to the original position assuming that a point where both output values based on the detection signals of the first and second position detecting sensors 51A, 51B switch from "H" (first signal H) to "L" (second signal L) as previously described with reference to FIG. 3 is the aforementioned PI center.

Figure 19:
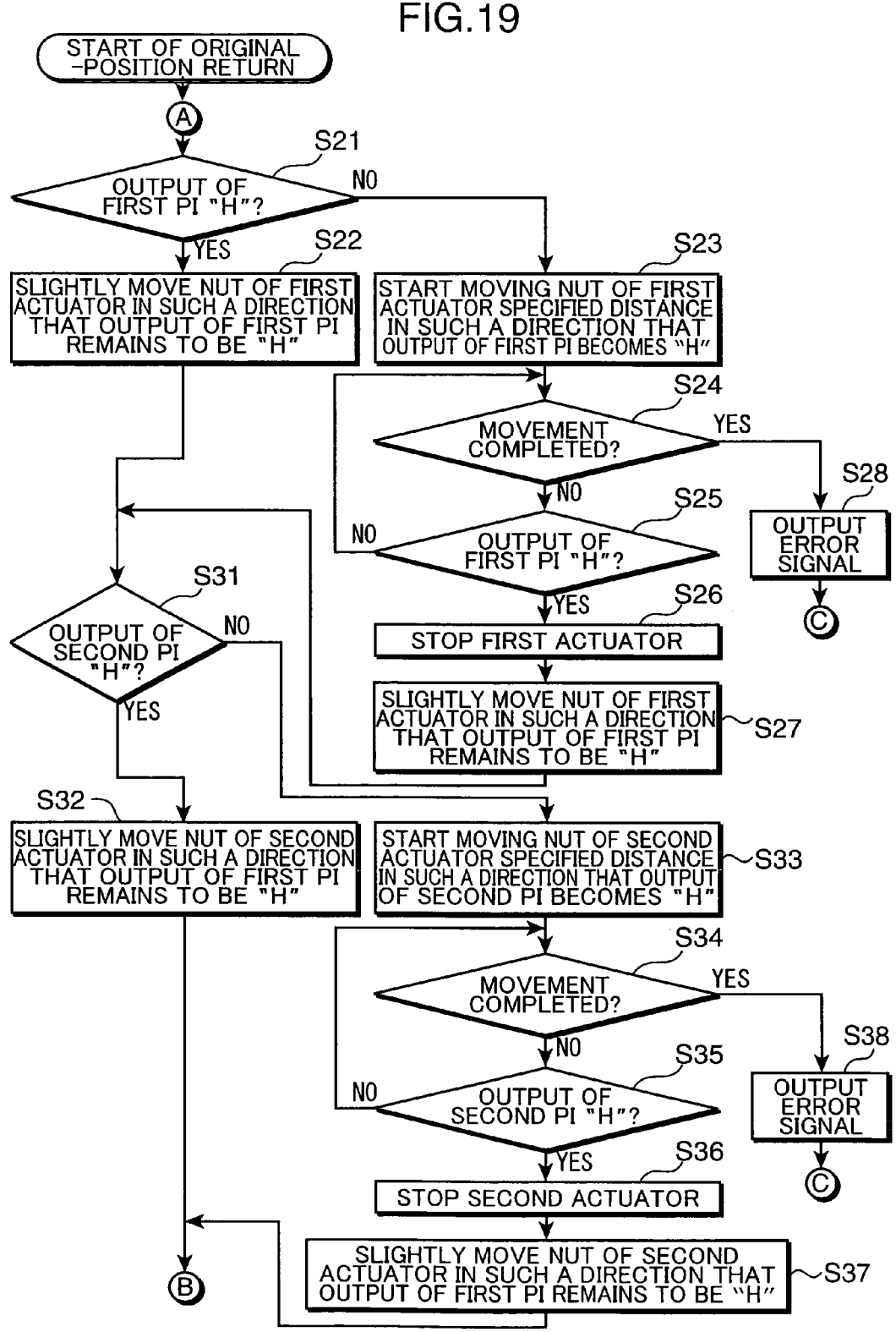
FIGS. 19 and 20 are a flowchart showing a barrel returning operation to the original position.
Figure 20:
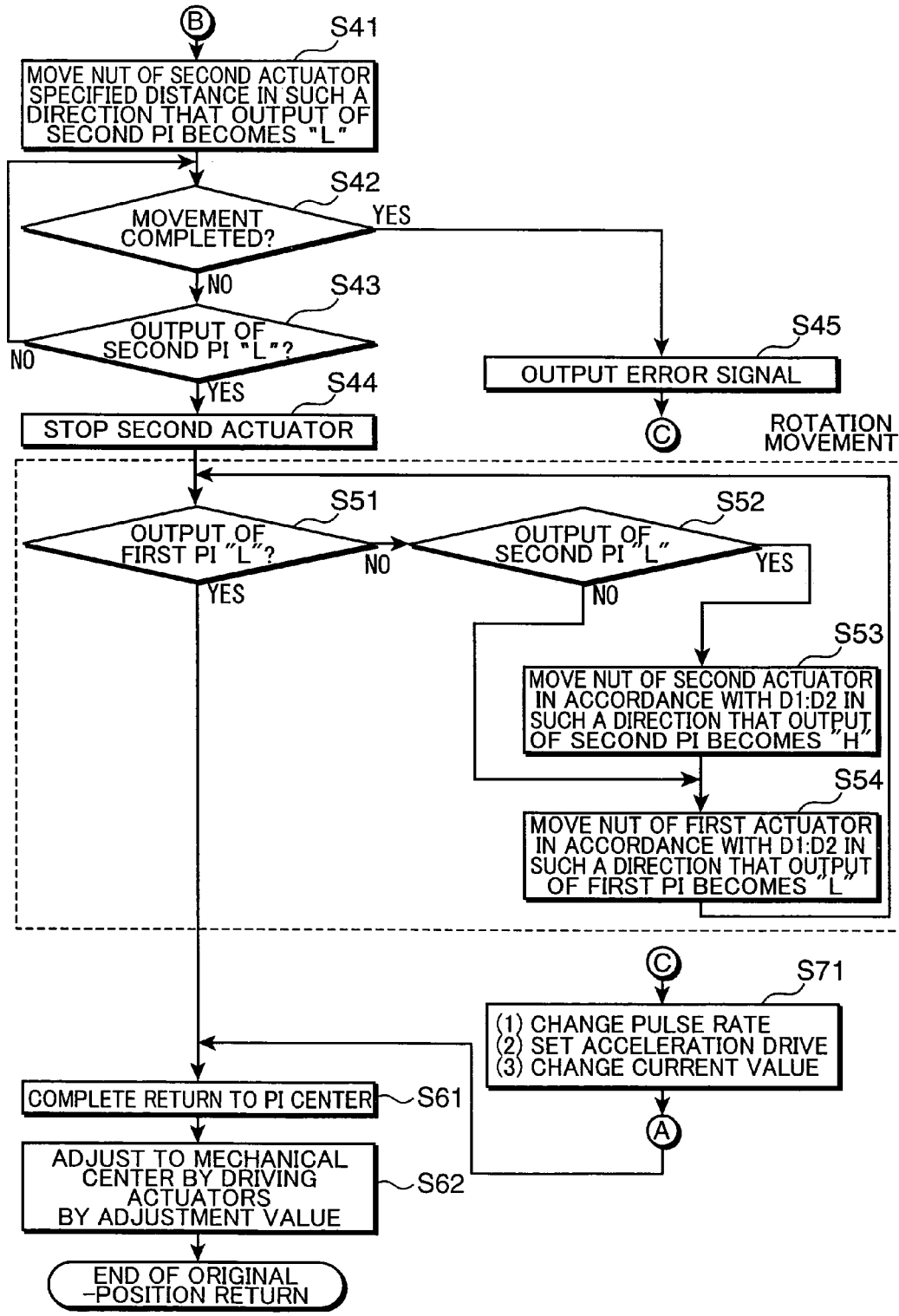

FIGS. 19 and 20 are a flowchart showing the original-position returning operation according to this embodiment, and FIGS. 21 to 24 are diagrams showing processes of returning the displaced barrel 2 to its original position. In these figures, the first and second position detecting sensors 51A, 51B are written as first PI and second PI, respectively. Further, "output is "H"" and "H output" mean that the first signal H is outputted from the first, second position detecting sensor 51A, 51B, whereas "output is "L"" and "L output" mean that the second signal L is outputted from the first, second position detecting sensor 51A, 51B.

The original-position returning process of the barrel 2 is carried out at the time of turning the electric camera 1 on or at a specified timing (e.g., after the execution of the shake correction for a predetermined period) during the operation of the electronic camera 1. Upon the start of the original-position returning process, the sensor controlling section 52 (see FIG. 12) of the original-position return controller 5 causes the first and second position detecting sensors 51A, 51B to operate, thereby entering a state where the position of the barrel 2 can be detected. Here, whether or not the output of the first position detecting sensor 51A is "H" is judged by the H/L judging section 53 (Step S21).

If the output of the first position detecting sensor 51A is "H" (YES in Step S21), the original-position return drive controlling section 45 generates a control signal to generate a specified small number of drive pulses (about several tens of pulses) in order to give a driving force from the nut 33A of the first actuator 3A to the first acting portion 27A to slightly move the barrel 2 in such a direction that the output of the first position detecting sensor 51A remains to be "H". Thus, the first actuator 3A moves the barrel 2 only an infinitesimal distance in such a direction that the output of the first position detecting sensor 51A remains to be "H" (Step S22). This operation is carried out to retract the barrel 2 to such a position where the H output can be securely obtained from the first detecting point 513A, assuming that the light blocking blade 512A is located near a boundary between the H output and the L output in the first detecting point 513A by the first position detecting sensor 51A (PI 511A).

On the other hand, unless the output of the first position detecting sensor 51A is "H" (NO in Step S21), the original-position return drive controlling section 45 generates a control signal to generate a specified number of drive pulses (about several hundreds of pulses) in order to move the barrel 2 (nut 33A) a specified distance in such a direction that the output of the first position detecting sensor 51A becomes "H". Thus, the first actuator 3A starts moving the barrel 2 only the specified distance in such a direction that the output of the first position detecting sensor 51A becomes "H" (Step S23).

There is, then, executed a loop of confirming whether or not the output of the first position detecting sensor 51A is "H"

(Step S25) while confirming whether or not a movement corresponding to the specified number of drive pulses given in Step S23 has been completed (a movement of the specified distance has been completed) (Step S24). In other words, if the movement of the specified distance has not been completed yet (NO in Step S24) and if the output of the first position detecting sensor 51A is not "H" (NO in Step S25), there is executed the loop of detecting the position of the barrel 2 by the first position detecting sensor 51A while moving the barrel 2 by the first actuator 3A in such a direction that the output of the first position detecting sensor 51A becomes "H".

The first actuator 3A is stopped (Step S26) when the output of the first position detecting sensor 51A becomes "H" (YES in Step S25) after the execution of the loop. Subsequently, as in previous Step S22, the first actuator 3A moves the barrel 2 only an infinitesimal distance in such a direction that the output of the first position detecting sensor 51A remains to be "H" in order to retract the barrel 2 to such a position where the H output can be securely obtained from the first detecting point 513A (Step S27).

On other hand, if no H output has been obtained from the first position detecting sensor 51A yet despite the completion of the movement corresponding to the specified number of drive pulses given in Step S23 (YES in Step S24), it means, after all, that the driving condition for the first actuator 3A given in Step S23 was not suitable or that the barrel 2 could not be moved as planned due to the action of an external force or other reason. Therefore, an error signal is outputted in this case (Step S28).

Figure 21:
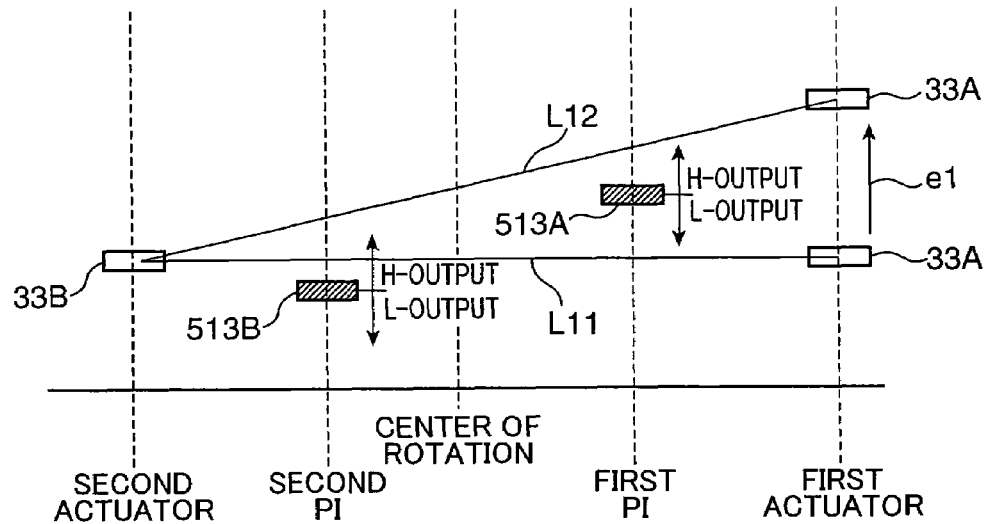
FIG. 21 is a diagram showing a process of returning the displaced barrel to its original position.

The above is the first operation (i) for the first detecting point 513A by the first position detecting sensor 51A. FIG. 21 is a diagram showing one example of such a first operation (operation from Step S23 to Step S27) in relation to the movement of the nut 33A of the first actuator 3A. Here, the posture of the barrel 2 at the start of the original-position returning process is such that the output of the second position detecting sensor 51B is "H", but that of the first position detecting sensor 51A is "L" as shown by a straight line L11 of FIG. 21. The straight line L11 is a straight line (connecting the disposed positions of the light blocking blades 512A, 512B) parallel with the straight line L10 (see FIG. 13) connecting the first and second acting portions 27A, 27B of the barrel 2 and indicative of the posture (inclination) with respect to the supporting plate 7. In FIG. 21, the original position of the barrel 2 is located on a straight line connecting the first detecting point 513A and the second detecting point 513B.

In such a state, the nut 33A of the first actuator 3A is linearly moved in such a direction that the output of the first position detecting sensor 51A becomes "H" (direction of arrow e1 in FIG. 21) (Step S23). The driving of the first actuator 3A is stopped (Step S26) upon reaching the state where the output of the first position detecting sensor 51A becomes "H", i.e., upon the arrival of the nut 33A at a point beyond the first detecting point 513A. At this time, a straight line L12 indicative of the posture of the barrel 2 represents such a state where the outputs of the first and second position detecting sensors 51A, 51B are both "H". This state is reached when the first operation is completed.

Referring back to FIG. 19, whether or not the output of the second position detecting sensor 51B is "H" is successively checked by the H/L judging section 53 (Step S31). Operations similar to those described in Steps S211 to S28 are performed for the second detecting portion 513B. Specifically, if the output of the second position detecting sensor 51B is "H" (YES in Step S31), the second actuator 3B moves the barrel 2 only an infinitesimal distance in such a direction that the output of the second position detecting sensor 51B remains to be "H" (Step S32) to retract the barrel 2 to such a position where the H output can be securely obtained at the second detecting point 513B by the second position detecting sensor 51B.

On the other hand, unless the output of the second position detecting sensor 51B is "H" (NO in Step S31), the original-position return drive controlling section 45 generates a control signal to generate a specified number of drive pulses in order to move the barrel 2 a specified distance in such a direction that the output of the second position detecting sensor 51B becomes "H". Thus, the second actuator 3B starts moving the barrel 2 only the specified distance in such a direction that the output of the second position detecting sensor 51B becomes "H" (Step S33).

There is, then, executed a loop of confirming whether or not the output of the second position detecting sensor 51B is "H" (Step S35) while confirming whether or not a movement corresponding to the specified number of drive pulses given in Step S33 has been completed (a movement of the specified distance has been completed) (Step S34). In other words, if the movement of the specified distance has not been completed yet (NO in Step S34) and if the output of the second position detecting sensor 51B is not "H" (NO in Step S25), there is executed the loop of detecting the position of the barrel 2 by the second position detecting sensor 51B while moving the barrel 2 by the second actuator 3B in such a direction that the output of the second position detecting sensor 51B becomes "H".

The second actuator 3B is stopped (Step S36) when the output of the second position detecting sensor 51B becomes "H" (YES in Step S35) after the execution of the loop. Subsequently, as in previous Step S32, the second actuator 3B moves the barrel 2 only an infinitesimal distance in such a direction that the output of the second position detecting sensor 51B remains to be "H" in order to retract the barrel 2 to such a position where the H output can be securely obtained from the second detecting point 513B (Step S37).

On the other hand, if no H output has been obtained from the second position detecting sensor 51B yet despite the completion of the movement corresponding to the specified number of drive pulses given in Step S33 (YES in Step S34), an error signal is outputted as in previous Step S28 (Step S38).

Figure 22:
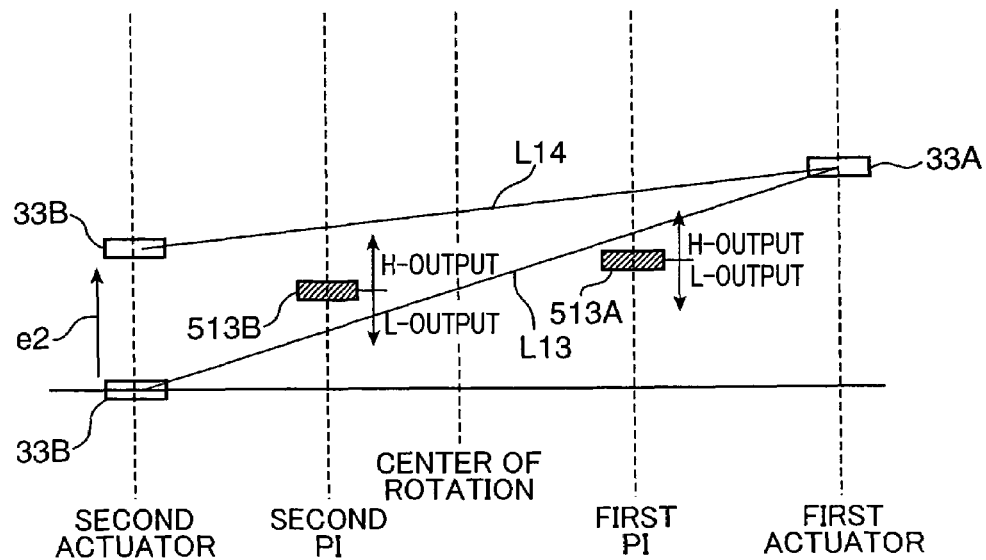
FIG. 22 is a diagram showing another process of returning the displaced barrel to its original position.

The above is the first operation (i) for the second detecting point 513B by the second position detecting sensor 51B. FIG. 22 is a diagram showing one example of such a first operation (operation from Step S33 to Step S37) in relation to the movement of the nut 33B of the second actuator 3B. Here, the posture of the barrel 2 at the start of the original-position returning process is such that the output of the first position detecting sensor 51A is "H", but that of the second position detecting sensor 51B is "L" as shown by a straight line L13 of FIG. 22.

In such a state, the nut 33B of the second actuator 3B is linearly moved in such a direction that the output of the second position detecting sensor 51B becomes "H" (direction of arrow e2 in FIG. 22) (Step S33). The driving of the second actuator 3B is stopped (Step S36) upon reaching the state where the output of the second position detecting sensor 51B becomes "H", i.e., upon the arrival of the nut 33B at a point beyond the second detecting point 513B. At this time, a straight line L14 indicative of the posture of the barrel 2 represents such a state where the outputs of the first and second position detecting sensors 51A, 51B are both "H". This state is reached when the first operation is completed.

Though not shown, both the nuts 33A, 33B of the first and second actuators 3A, 3B are moved in the directions of arrows e1, e2 shown in FIGS. 21, 22 if the posture of the barrel 2 at the start of the original-position returning process is such that the outputs of both first and second position detecting sensors 51A, 51B are "L".

Next, the second operation (ii) and the third operation (iii) are described with reference to a flowchart of FIG. 20. With the outputs of both first and second position detecting sensors 51A, 51B set at "H" as shown in FIGS. 21 or 22, the original-position return drive controlling section 45 generates a control signal to generate a specified number of drive pulses (about from 1000 to 2000 pulses) as the second operation in order to move the nut 33B of the second actuator 3B only a specified distance in such a direction that the output of the second position detecting sensor 51B becomes "L". Thus, the movement of the nut 33B is started, whereby the barrel 2 is moved in such a direction that the output of the second position detecting sensor 51B becomes "L" (Step S41).

There is, then, executed a loop of confirming whether or not the output of the second position detecting sensor 51B is "L" (Step S43) while confirming whether or not a movement corresponding to the specified number of drive pulses given in Step S41 has been completed (a movement of the specified distance has been completed) (Step S42). In other words, if the movement of the specified distance has not been completed yet (NO in Step S42) and if the output of the second position detecting sensor 51B is not "L" (NO in Step S43), there is executed the loop of detecting the position of the barrel 2 by the second position detecting sensor 51B while moving the barrel 2 by the second actuator 3B in such a direction that the output of the second position detecting sensor 51B becomes "L".

The second actuator 3B is stopped (Step S44) when the output of the second position detecting sensor 51B becomes "H" (YES in Step S43) after the execution of the loop. On other hand, if no L output has been obtained from the second position detecting sensor 51B yet despite the completion of the movement corresponding to the specified number of drive pulses given in Step S41 (YES in Step S42), an error signal is outputted as in previous Step S28 (Step S45).

Figure 23:
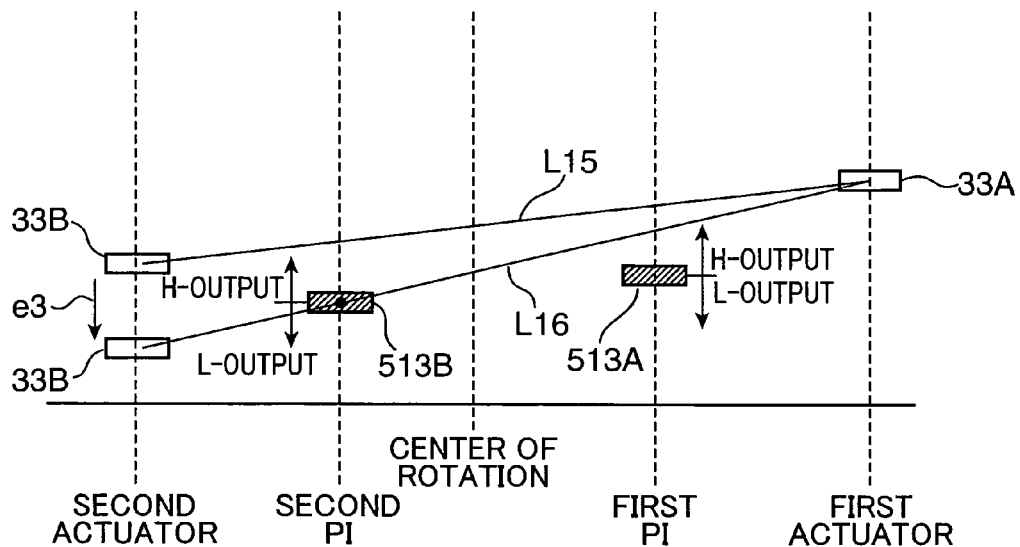
FIG. 23 is a diagram showing still another process of returning the displaced barrel to its original position.

The above is the second operation (ii) for the second detecting point 513B by the second position detecting sensor 51B. FIG. 23 is a diagram showing one example of such a second operation (operation from Step S41 to Step S44) in relation to the movement of the nut 33B of the second actuator 3B. Here, the posture of the barrel 2 at the end of the first operation is indicated by a straight light L15 in FIG. 23.

In such a state, the nut 33B of the second actuator 3B is linearly moved in such a direction that the output of the second position detecting sensor 51B becomes "L" (direction of arrow e3 in FIG. 23) (Step S41). The driving of the second actuator 3B is stopped (Step S44) upon reaching the state where the output of the second position detecting sensor 51B becomes "L", i.e., upon moving the nut 33B to return to the second detecting point 513B. At this time, a straight line L16 indicative of the posture of the barrel 2 represents such a state where the output of the first position detecting sensor 51A is "H", but that of the second position detecting sensor 51B is "L" (state immediately after the switch from the H output to the L output). In other words, the barrel 2 is returned to the original position at the second detecting point 513B.

Although the nut 33B of the second actuator 3B is moved as the second operation to first return the barrel 2 to the original position at the second detecting point 513B here, the nut 33A of the first actuator 3A may be moved as the second operation to first return the barrel 2 to the original position at the first detecting point 513A.

Subsequently, the third operation is carried out. Here, the original-position return drive controlling section 45 executes a loop of obtaining such a point where the outputs of both first and second position detecting sensors 51A, 51B become "L" while rotating the barrel 2 with the second detecting point 513B where the barrel 2 has returned to the original position as a center of rotation. Specifically, whether or not the output of the first position detecting sensor 51A is "L" is confirmed (Step S51) and, if the confirmation result is negative (NO in Step S51), whether or not the output of the second position detecting sensor 51B is "L" is confirmed (Step S52). The output of the second position detecting sensor 51B is confirmed again because of a possibility to displace the barrel 2 returned to the original position at the second detecting point 513B during the execution of the third operation.

If the output of the second position detecting sensor 51B is kept at "L" (YES in Step S52), the nut 33B of the second actuator 3B is moved only a first distance in such a direction that the output of the second position detecting sensor 51B becomes "H" (Step S53). Subsequently, the nut 33A of the first actuator 3A is moved only a second distance in such a direction that the output of the first position detecting sensor 51A becomes "L" (Step S54).

Figure 24:
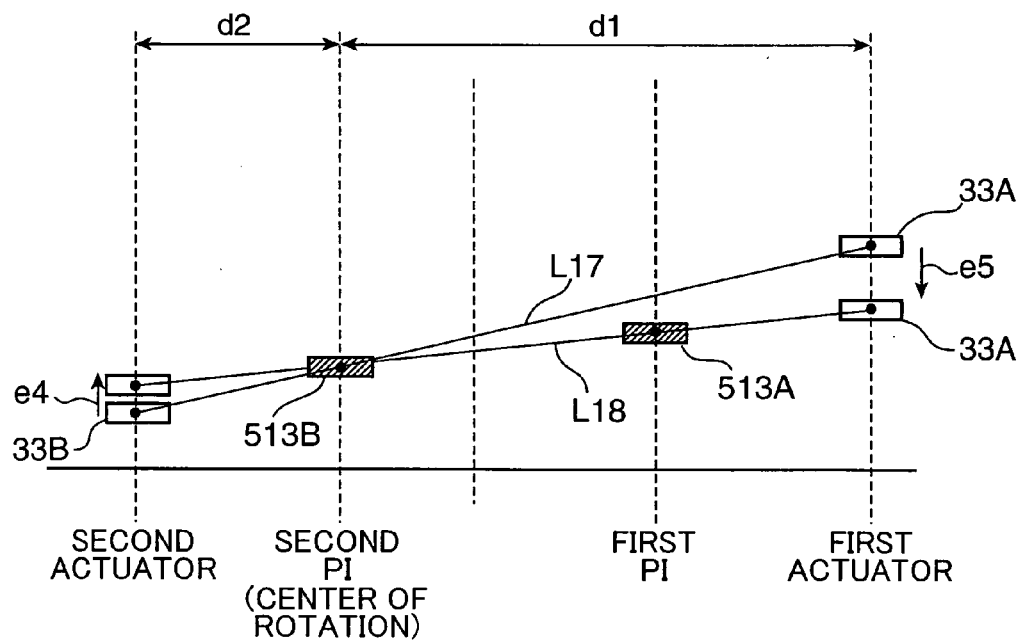
FIG. 24 is a diagram showing further another process of returning the displaced barrel to its original position.

Such an operation is described with reference to FIG. 24. FIG. 24 is a diagram showing one example of the third operation (operation of Steps S53, S54) in relation to the movement of the nut 33A of the first actuator 3A and that of the nut 33B of the second actuator 3B. Here, the posture of the barrel 2 at the end of the second operation is indicated by a straight light L17 in FIG. 24. In such a state, the nut 33B of the second actuator 3B is slightly linearly moved only the specified first distance in such a direction that the output of the second position detecting sensor 51B becomes "H" (direction of arrow e4 in FIG. 24) (Step S53). Subsequently, the nut 33A of the first actuator 3A is slightly moved only the specified second distance in such a direction that the output of the first position detecting sensor 51A becomes "L" (direction of arrow e5 in FIG. 24) (Step S53). In this way, the barrel 2 is rotated with the second detecting point 513B where the barrel 2 was returned to its original position as a center of rotation.

The first and second distances are determined in accordance with distances d1, d2 (see FIG. 24) from the second detecting point 513B as a center of rotation to the respective nuts 33A, 33b (first, second acting points 27A, 27B). Specifically, the respective nuts 33A, 33B are moved according to a ratio d1:d2 in order to rotate the barrel 2 with the second detecting point 513B as a center of rotation. For example, if d1:d2=2:1, two drive pulses are given to the second actuator 3B while four drive pulses are given to the first actuator 3A. The original-position return drive controlling section 45 generates drive pulse generating signals corresponding to the distance ratio of d1:d2.

If the output of the second position detecting sensor 51B is not kept at "L" in Step S52 (NO in Step S52), only Step S54 is executed without executing Step S53 (only the nut 33A is moved only the second distance). Thereafter, this routine returns to Step S51 to repeat a similar loop. During each execution of such a loop, the barrel 2 is slightly rotated with the second detecting point 513B as a center of rotation.

If the output of the first position detecting sensor 51A becomes "L" (YES in Step S51), the original-position return drive controlling section 45 ends the third operation assuming that the barrel 2 has been completely returned to the original position at both first and second detecting points 513A, 513B, i.e., the return to the PI center has been completed (Step S61). A straight line L18 shown in FIG. 24 indicates a state where the PI center is reached. Thereafter, the first and second actuators 3A, 3B are driven for an adjustment to the mechanical center of the barrel 2, whereby the nuts 33A, 33B are moved only distances saved as adjustment values beforehand (Step S62). In this way, the original-position returning operation is completed.

If the error signal is outputted during the first or second operation (Step S28, Step S38, Step S45), specified retry setting is made (Step S71). For example, the powers (torques) of the first and second actuators 3A, 3B are increased by changing the pulse rate of the drive pulses given to the first and second actuators 3A, 3B, changing the acceleration drive setting or changing the current value. Then, returning to Step S21 shown in FIG. 19, a similar processing is repeated in a powered up state.

Description of Other Embodiments of the Barrel Unit

Figure 25:
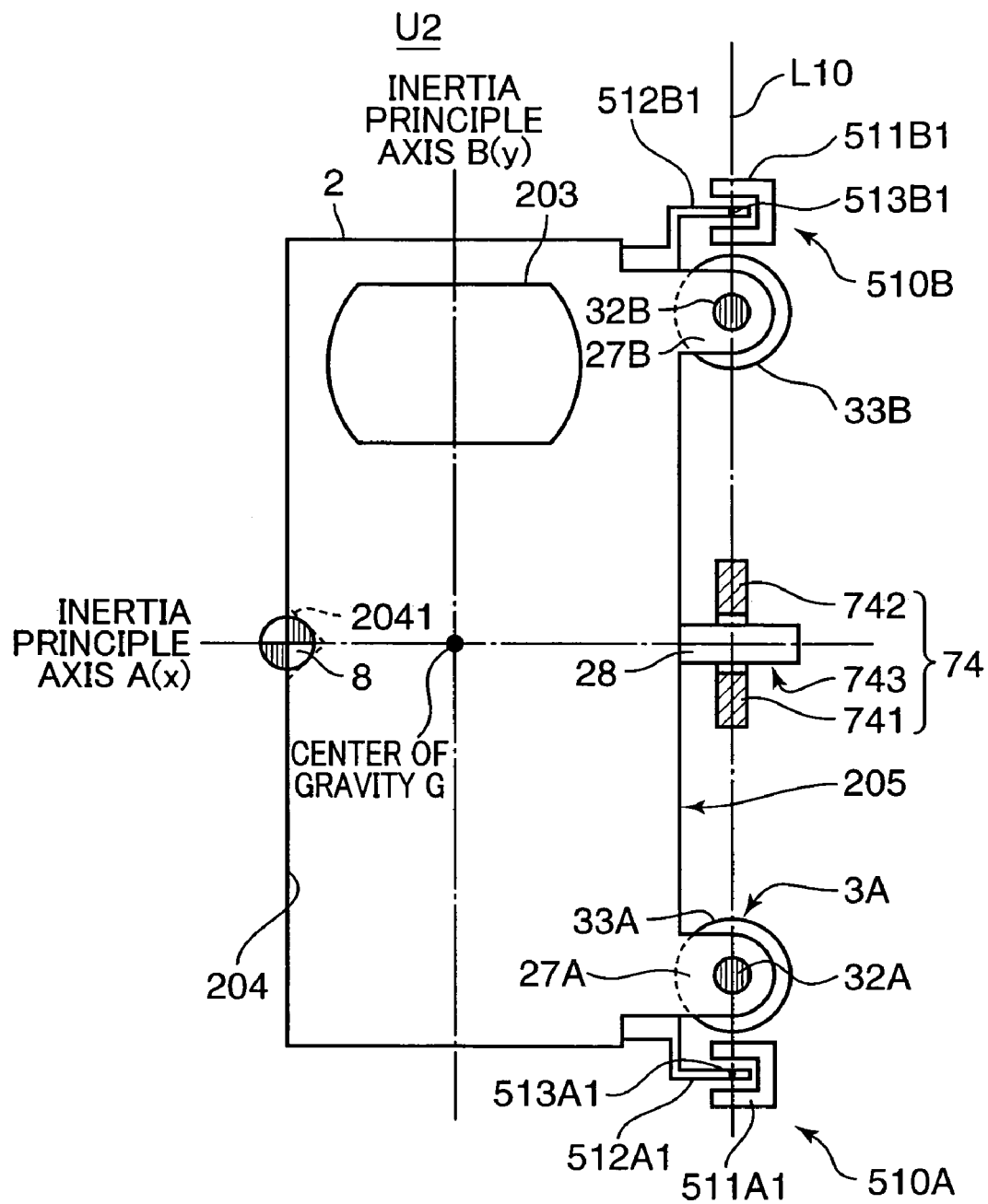
FIG. 25 is a construction diagram schematically showing the construction of a barrel unit according to another embodiment of the invention.
Figure 26:
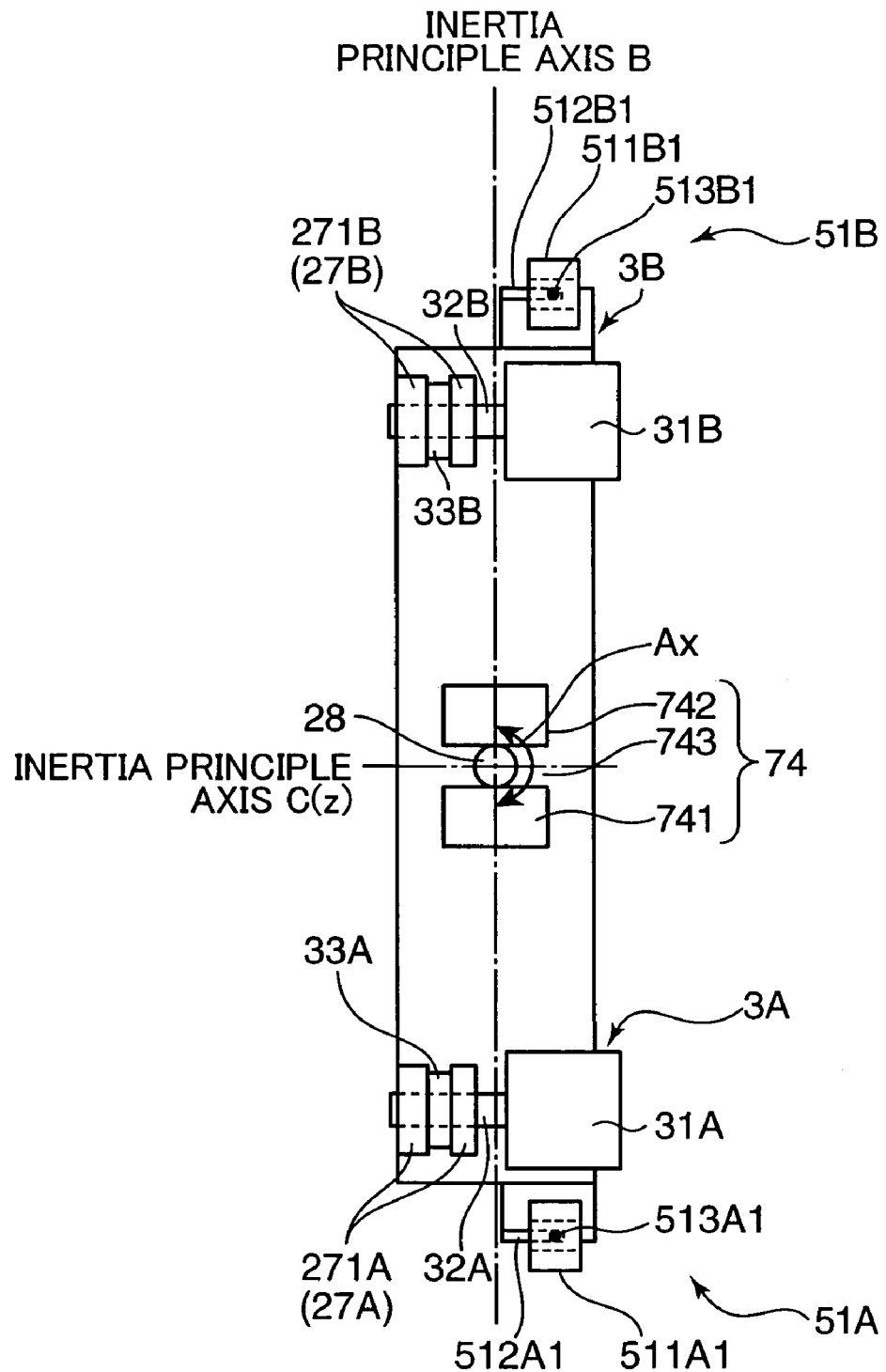
FIG. 26 is a side view of the barrel unit of FIG. 25.

FIG. 25 is a construction diagram schematically showing the construction of a barrel unit U2 according to a second embodiment, and FIG. 25 is a side view of the barrel unit of FIG. 25. Different from FIG. 13, the supporting plate 7 is not shown in FIG. 25.

This barrel unit U2 basically has the same construction as the barrel unit U1 shown in FIG. 13 and is provided with a barrel 2, a supporting plate (not shown) pivotally supporting the barrel 2, a steel ball 8 provided between the barrel 2 and the supporting plate and serving as a pivot bearing portion, a first and a second actuators 3A, 3B for giving driving forces to the barrel 2 for shake correction, and a first and a second position detecting sensor 510A, 510B for detecting the rotational posture of the barrel 2.

A point of difference from the barrel unit U1 shown in FIG. 13 is the disposed positions of the first and second position detecting sensors 51A, 51B. Specifically, in this barrel unit U2, the first position detecting sensor 510A is disposed on (or near) a straight line L10 connecting first and second acting portions 27A, 27B of the first and second actuators 3A, 3B, proximate to and at an outer side (side opposite to an inertia principle axis A) of the acting portion 27A of the first actuator 3A, whereas the second position detecting sensor 510B is disposed on (or near) the straight ling L10, proximate to and at an outer side (side opposite to the inertia principle axis A) of the acting portion 27B of the second actuator 3B.

Similar to the barrel unit U1, the first position detecting sensor 510A is constructed by a PI sensor comprised of a PI 511A1 and a light blocking blade 512A1. The light blocking blade 512A1 projects proximate to and at the outer side of the first acting portion 27A on a second side surface 205 of the barrel 2 (bottom end of the barrel 2). The PI 511A1 is supported on the unillustrated supporting plate while being aligned with the disposed position of the light blocking blade 512A1, and includes a first detecting portion 513A1 on a line connecting a light emitting element and a light receiving element provided in the PI 511A1. The second position detecting sensor 510B is constructed by a PI sensor similarly comprised of a PI 511B1 and a light blocking blade 512B1. The light blocking blade 512B1 projects at a position proximate to and at the outer side of the second acting portion 27B on the second side surface 205 of the barrel 2 (upper end of the barrel 2), and the PI 511B1 includes a second detecting portion 513B1.

Figure 27:
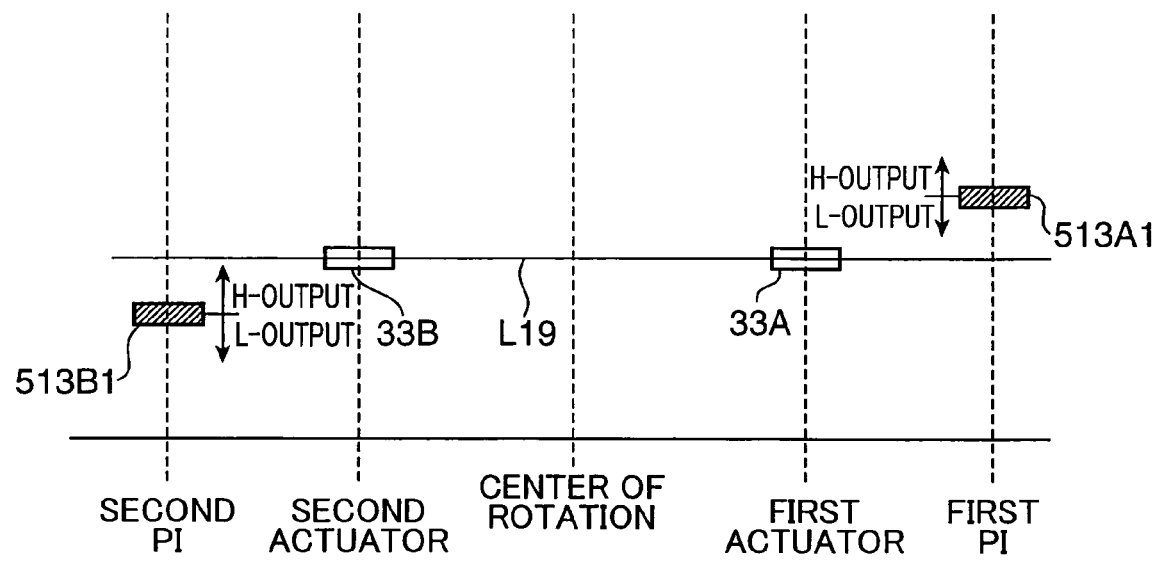
FIG. 27 is a diagram showing a process of returning a displaced barrel to its original position.

In such a barrel unit U2 as well, the original-position return drive controlling section 45 can execute the original-position returning operation substantially in the same manner as in the operation previously described with reference to FIGS. 21 to 24. Specifically, in the case of the barrel unit U2, it remains unchanged to adjust a straight line L19 indicative of the posture of the barrel 2 to the first and second detecting portions 513A1, 513B1 although the positional relationship between the nuts 33A, 33B of the first and second actuators 3A, 3B and the first and second detecting portions 513A1, 513B1 are reversed inside out as shown in FIG. 27. Thus, it is sufficient to perform the above first to third operations.

Figure 28:
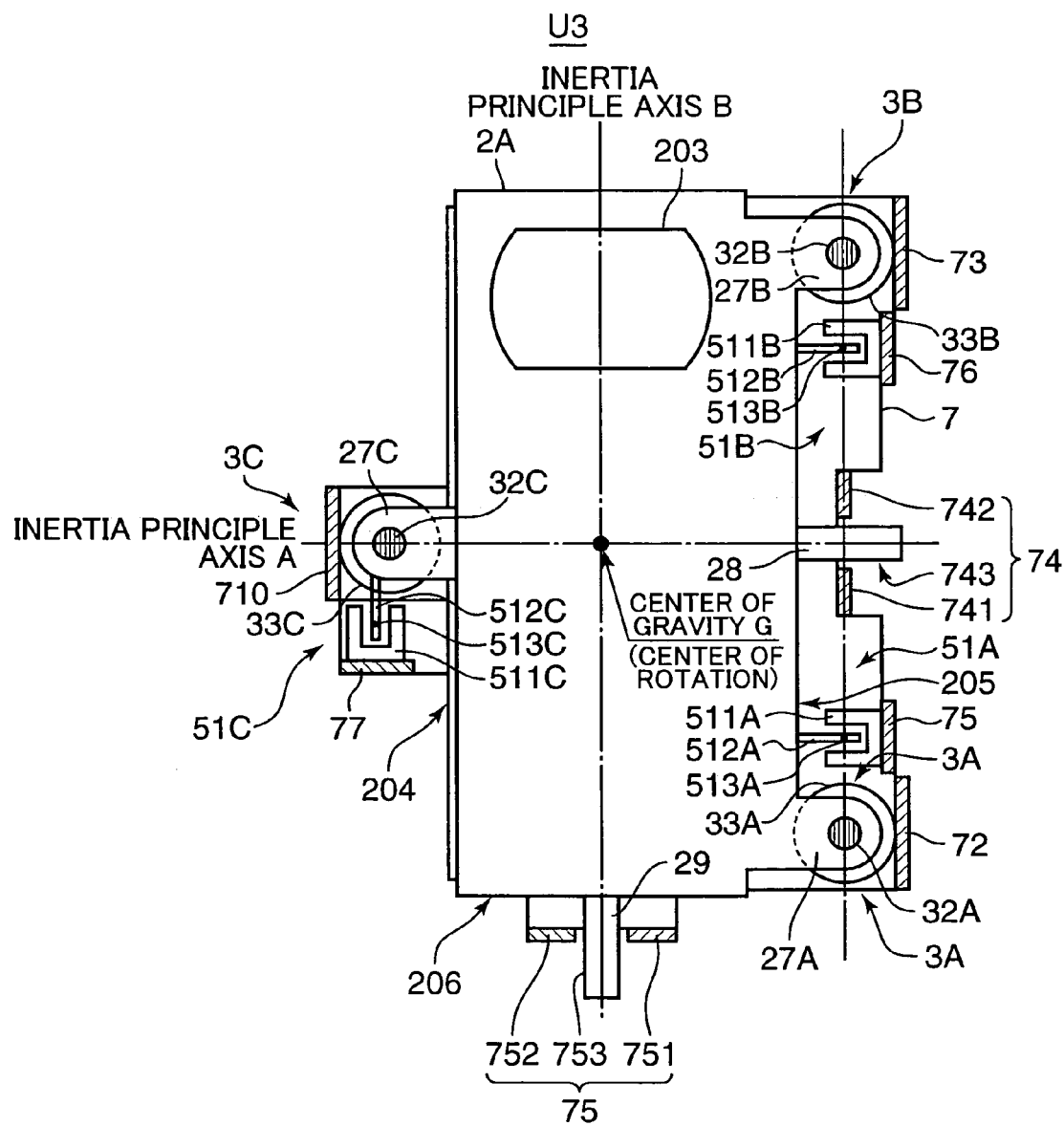
FIG. 28 is a construction diagram schematically showing the construction of a barrel unit according to still another embodiment of the invention.

FIG. 28 is a construction diagram schematically showing the construction of a barrel unit U3 according to a third embodiment. This barrel unit U3 differs from the barrel unit U1 shown in FIG. 13 in that a barrel 2A is supported by three actuators without using the steel ball 8. Specifically, the barrel unit U3 is so supported at three points as to enclose a center of gravity G of the barrel 2A by the first and second actuators 3A, 3B and a third actuator 3C arranged in place of the steel ball 8.

The first to third actuators 3A to 3C are linear actuators each including a stepping motor as in the barrel unit U1. The third actuator 3C added in this embodiment also includes a motor main body 31C, an externally threaded rotary shaft 32C and a disk nut 33C similar to those described above. First and second acting portions 27A, 27B to which driving forces from the first and second actuators 3A, 3B are given are provided on a second side surface 205 of the barrel 2A. In addition, a third acting portion 27C to which a driving force from the third actuator 3C is given is provided in the center of a first side surface 204. It should be noted that the supporting plate 7 includes a third-actuator supporting portion 710.

As position detecting sensors, a third position detecting sensor 51C arranged near the acting portion 27C of the third actuator 3C is provided in addition to first and second position detecting sensors 51A, 51B. This third position detecting sensor 51C is constructed by a PI sensor comprised of a PI 511C and a light blocking blade 512C. The light blocking blade 512C projects from a nut bearing 271A forming the acting portion 27A. The PI 511C is mounted on a third PI supporting portion 77 of the supporting plate 7. A third detecting portion 513C is defined on a line connecting light emitting and receiving elements in a detection space provided in the PI 511C, and a first signal H or a second signal L is outputted from the second position detecting sensor 51C depending on whether or not the light blocking blade 512C has performed a specified partial light blocking in the third detecting portion 513C.

This barrel 2A is provided with two guide pins (first guide pin 28 and second guide pin 29) to constrain movements. The first guide pin 28 projects along an inertia principle axis A from the second side surface 205 of the barrel 2A, whereas the second guide pin 29 projects along an inertia principle axis B from a bottom surface 206 of the barrel 2A. These first and second guide pins 28, 29 are engaged with first and second guide-pin supporting portions 74, 75 of the supporting plate 7, respectively. These engagements solely act to restrict the shake of the inertia principle axis A with the first guide pin 28 as a supporting point (normally, there is a play in actuators) resulting from the arrangement of the third actuator in place of the steel ball 8.

In such a barrel unit U3 as well, the original-position return drive controlling section 45 can execute the original-position returning operation substantially in the same manner as in the operation previously described with reference to FIGS. 21 to 24. Specifically, the original-position returning operation can be performed by driving the third actuator 3C to detect the position by means of the third position detecting sensor 51C in addition to the operation previously described with reference to FIGS. 21 to 24.

Description of Further Embodiments

The present invention can also be embodied as follows.

(1) Although the stepping motors are used as the actuators in the foregoing embodiments, various other actuators are applicable. For example, actuators using moving coils, those using a combination of a small-size motor and a gear mechanism or a ball screw mechanism, or those using a piezoelectric element (impact piezoelectric actuators, etc.) can also be used. These various types of actuators may be combined or biasing springs such as tensile springs, compression springs, leaf springs or spring washers may be additionally used.

(2) Although the driving forces are directly given to the acting portions of the barrel from the actuators (driving force is directly given from the nut 33A of the first actuator 3A to the first acting portion 27A in the case of FIG. 13) in the foregoing embodiments, they may be indirectly given via torque transmission mechanisms such as worms.

(3) The first and second position detecting sensors 51A, 51B are disposed proximate to and at the inner sides of the first and second acting portions 27A, 27B of the first and second actuators 3A, 3B in the barrel unit U1 shown in FIG. 13, and the first and second position detecting sensors 510A, 510B are disposed proximate to and at the outer sides of the first and second acting portions 27A, 27B in the barrel unit U2 shown in FIG. 25. However, one position detecting sensor may be disposed at the inner side of the first or second acting portion 27A or 27B and the other may be disposed at the outer side of the second or first acting portion 27B or 27A.

As described above, a rotating device is operable to rotate a drivable element while supporting it at first, second and third points. The drivable element has an arbitrary point located at inner sides of the three supporting points, a first axis which is an axis located on a specified plane including the arbitrary point and passing the arbitrary point, a second axis passing the arbitrary point and orthogonal to the first axis on the plane, and a third axis which is an axis perpendicular to the plane and passing the arbitrary point.

The rotating device is provided with: a first actuator for giving a driving force along a direction parallel with the third axis, the first supporting point being an acting portion of the first actuator; a second actuator for giving a driving force along a direction parallel with the third axis, the second supporting point located at a side of the first or second axis opposite to the first supporting point being an acting portion of the second actuator; a supporting portion provided at the third supporting point to support the drivable element rotatably about a first rotation axis extending in a direction parallel with the first axis and/or a second rotation axis extending in a direction parallel with the second axis by the driving forces given by the first and second actuators; a first position detector located on or near a line connecting the acting portions of the first and second actuators, including a detecting portion near the acting portion of the first actuator and adapted to detect the rotational posture of the drivable element; and a second position detector located on or near the line connecting the acting portions of the first and second actuators, including a detecting portion near the acting portion of the second actuator and adapted to detect the rotational posture of the drivable element.

With this construction, the drivable element is supported at three points, and at least two of the three supporting points are the respective acting portions of the first and second actuators. Accordingly, a posture of the drivable element which is rotatably driven about the first rotation axis and/or the second rotation axis can be detected accurately in a simpler construction. Specifically, since the respective detecting portions of the first and second position detectors are located on or near the line connecting the acting portions of the first and second actuators, a position deviation with respect to both the first rotation axis and the second rotation axis can be detected by two position sensors only. Also, the detecting portions of the first and second position detectors are respectively located near the acting portions of the first and second actuators. Accordingly, the drivable element can be quickly returned to the original position because the driving point and the position detecting point are closer to each other.

The first and second position detectors may preferably detect the positions of specified position detecting points set on an outer surface of the drivable element. This construction can eliminate expensive position sensors such as two-dimensional PSD, two-dimensional Hall sensor, and thus assure simpler configuration for position detection of a drivable element.

The first and second position detectors may be preferably provided with first and second switchers for outputting first and second signals H, L which change upon detecting the position detecting point. The rotating device may be further provided with a posture controller for controlling the posture of the drivable element by causing the first and second actuators to operate. The posture controller drives the first and second actuators in the same direction with the first signals H or the second signals L outputted from both first and second switchers, and subsequently executes such a control as to drive the first and second actuators in opposite directions such that the drivable element is rotated with the disposed position of the first or second switchers having outputted the second signal L or the first signal H or a position proximate thereto as a center of rotation if the drivable element is rotated up to a position where the second signal L or the first signal H is outputted from either one of the first and second switchers.

Also, the posture controller may be preferably made to perform successively: a first operation of causing at least one of the first and second actuators to operate such that the first signals H or the second signals L are outputted from both first and second switchers; a second operation of causing at least one of the first and second actuators to operate such that the first signal H or the second signal L is outputted from either one of the first and second switchers; and a third operation of causing the first and second actuators to operate such that the drivable element is rotated with the disposed position of the first or second switcher having outputted the second signal L or the first signal H in the second operation or a position proximate thereto as a center of rotation and the first signals H or the second signals L are outputted from both first and second switchers.

These constructions can return the drivable element to the original position more efficiently and more quickly.

A barrel unit comprises a barrel having a built-in photographing optical system including an image sensing device; and a supporting plate for pivotally supporting the barrel at least at three points of first to third points, driving forces being given to the barrel for shake correction. The barrel has an arbitrary point located at inner sides of the three supporting points, a first axis which is an axis located on a specified plane including the arbitrary point and passing the arbitrary point, a second axis passing the arbitrary point and orthogonal to the first axis on the plane, and a third axis which is an axis perpendicular to the plane and passing the arbitrary point; a first actuator for giving a driving force along a direction parallel with the third axis, the first supporting point being an acting portion of the first actuator; a second actuator for giving a driving force along a direction parallel with the third axis, the second supporting point located at a side of the first or second axis opposite to the first supporting point being an acting portion of the second actuator; a supporting portion provided at the third supporting point to support the barrel rotatably about a first rotation axis extending in a direction parallel with the first axis and/or a second rotation axis extending in a direction parallel with the second axis by the driving forces given by the first and second actuators, a first position detector located on or near a line connecting the acting portions of the first and second actuators, including a detecting portion near the acting portion of the first actuator and adapted to detect the rotational posture of the barrel; and a second position detector located on or near the line connecting the acting portions of the first and second actuators, including a detecting portion near the acting portion of the second actuator and adapted to detect the rotational posture of the barrel.

With the arrangement, the rotational posture of the barrel can be detected by a simpler configuration, and the barrel can be returned to the original position more quickly.

It may be preferable that the barrel has a first side surface and a second side surface opposed to the first side surface, out of the three supporting points, those by the acting portions of the first and second actuators are located on either the first or the second side surface and the remaining one is located on the opposite surface, and the barrel is driven about the first and second rotation axes for shake correction by the driving forces given from the acting portions of the first and second actuators.

Also, the supporting point by one pivot bearing portion provided between the supporting plate and the barrel may be preferably located on the first side surface while those by the acting portions of the first and second actuators are located on the second side surface. The supporting point by the pivot bearing portion may be located on the first or second axis between the acting portions of the first and second actuators.

Further, it may be preferable to locate the supporting point by the acting portion of the third actuator on the first side surface while those by the acting portions of the first and second actuators are located on the second side surface, and the supporting point by the acting portion of the third actuator on the first or second axis between the first and second actuators, and a detecting portion of a third position detector for detecting the rotational posture of the barrel near the acting portion of the third actuator.

With these constructions, the actuators can be arranged at positions proper to drive the shake correction of the barrel, which assures a barrel unit capable of returning the barrel to the original position more quickly.

An image sensing apparatus is provided with the above-mentioned barrel unit, a shake detector for detecting a shake amount given to the image sensing apparatus installed with the barrel unit, and a shake correction controller for generating shake correction drive signals for actuators provided in the barrel unit in accordance with the shake amount detected by the shake detector.

This arrangement can provide an image sensing apparatus which is inexpencive and is capable of accomplishing the high speed original-position return and the quick photographing start because a rotational posture of the barrel can be detected by a simpler construction, and the barrel is returned to the original position more quickly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A rotating device for rotating a drivable element while supporting it at first, second and third points, the drivable element having an arbitrary point located at inner sides of the three supporting points, a first axis which is an axis located on a specified plane including the arbitrary point and passing the arbitrary point, a second axis passing the arbitrary point and orthogonal to the first axis on the plane, and a third axis which is an axis perpendicular to the plane and passing the arbitrary point, comprising:
    a first actuator for giving a driving force along a direction parallel with the third axis, the first supporting point being an acting portion of the first actuator;
    a second actuator for giving a driving force along a direction parallel with the third axis, the second supporting point located at a side of the first or second axis opposite to the first supporting point being an acting portion of the second actuator;
    a supporting portion provided at the third supporting point to support the drivable element rotatably about a first rotation axis extending in a direction parallel with the first axis and/or a second rotation axis extending in a direction parallel with the second axis by the driving forces given by the first and second actuators;
    a first position detector located on or near a line connecting the acting portions of the first and second actuators, including a detecting portion near the acting portion of the first actuator and adapted to detect the rotational posture of the drivable element; and
    a second position detector located on or near the line connecting the acting portions of the first and second actuators, including a detecting portion near the acting portion of the second actuator and adapted to detect the rotational posture of the drivable element.

2. A rotating device according to claim 1, wherein the first and second position detectors detect the positions of specified position detecting points set on an outer surface of the drivable element.

3. A rotating device according to claim 2, wherein:
    the first and second position detectors include first and second switchers for outputting first and second signals H, L which change upon detecting the position detecting point;
    the rotating device further includes a position controller for controlling the posture of the drivable element by causing the first and second actuator to operate; and
    the posture controller drives the first and second actuators in the same direction with the first signals H or the second signals L outputted from both first and second switchers, and subsequently executes such a control as to drive the first and second actuators in opposite directions such that the drivable element is rotated with the disposed position of the first or second switchers having outputted the second signal L or the first signal H or a position proximate thereto as a center of rotation if the drivable element is rotated up to a position where the second signal L or the first signal H is outputted from either one of the first and second switchers.

4. A rotating device according to claim 2, wherein:
    the first and second position detectors include first and second switchers for outputting first and second signals H, L which change upon detecting the position detecting point;

the rotating device further include a posture controller for controlling the posture of the drivable element by causing the first and second actuators to operate; and the posture controller performing successively:

a first operation of causing at least one of the first and second actuators to operate such that the first signals H or the second signals L are outputted from both first and second switchers;

a second operation of causing at least one of the first and second actuators to operate such that the first signal H or the second signal L is outputted from either one of the first and second switchers; and a third operation of causing the first and second actuators to operate such that the drivable element is rotated with the disposed position of the first or second switcher having outputted the second signal L or the first signal H in the second operation or a position proximate thereto as a center of rotation and the first signals H or the second signals L are outputted from both first and second switchers.

5. A rotating device according to claim 1, wherein the supporting portion consists of a steel ball.

6. A rotating device according to claim 1, wherein each of the first and second position detectors are either mechanical switches or photointerrupter sensors.

7. A rotating device according to claim 1, wherein the third supporting point includes a ball and the drivable element is rotatably supported about the ball to define the first rotation axis and the second rotation axis.

8. A barrel unit, comprising:

a barrel including a built-in-photographing optical system having an image sensing device;

a supporting plate for pivotally supporting the barrel at least at three points of first to third points;

driving forces being given to the barrel for shake correction;

the barrel having an arbitrary point located at inner sides of the three supporting points, a first axis which is an axis located on a specified plane including the arbitrary point and passing the arbitrary point, a second axis passing the arbitrary point and orthogonal to the first axis on the plane, and a third axis which is an axis perpendicular to the plane and passing the arbitrary point;

a first actuator for giving a driving force along a direction parallel with the third axis, the first supporting point being an acting portion of the first actuator;

a second actuator for giving a driving force along a direction parallel with the third axis, the second supporting point located at a side of the first or second axis opposite to the first supporting point being an acting portion of the second actuator;

a supporting portion provided at the third supporting point to support the barrel rotatably about a first rotation axis extending in a direction parallel with the first axis and/or a second rotation axis extending in a direction parallel with the second axis by the driving forces given by the first and second actuators, a first position detector located on or near a line connecting the acting portions of the first and second actuators, including a detecting portion near the acting portion of the first actuator and adapted to detect the rotational posture of the barrel; and a second position detector located on or near the line connecting the acting portions of the first and second actuators, including a detecting portion near the acting portion of the second actuator and adapted to detect the rotational posture of the barrel.

9. A barrel unit according to claim 8, wherein:

the barrel has a first side surface and a second side surface opposed to the first side surface, two supporting points by the acting portions of the first and second actuators are located on either the first or the second side surface and the remaining supporting point is located on the opposite surface, and the barrel is driven about the first and second rotation axes for shake correction by the driving forces given from the acting portions of the first and second actuators.

10. A barrel unit according to claim 9, wherein the supporting point by one pivot bearing portion provided between the supporting plate and the barrel is located on the first side surface while those by the acting portions of the first and second actuators are located on the second side surface, and the supporting point by the pivot bearing portion is located on the first or second axis between the acting portions of the first and second actuators.

11. A barrel unit according to claim 9, wherein:

the supporting point by the acting portion of the third actuator is located on the first side surface while those by the acting portions of the first and second actuators are located on the second side surface, the supporting point by the acting portion of the third actuator is located on the first or second axis between the first and second actuators, and a detecting portion of the third position detector for detecting the rotational posture of the barrel is disposed near the acting portion of the third actuator.

12. An image sensing apparatus, comprising:

a barrel unit including a barrel having a built-in photographing optical system including an image sensing device, and a supporting plate for pivotally supporting the barrel at least at three points of first to third points, driving forces being given to the barrel for shake correction, a shake detector for detecting a shake amount given to the image sensing apparatus installed with the barrel unit, a shake correction controller for generating shake correction drive signals for actuators provided in the barrel unit in accordance with the shake amount detected by the shake detector, the barrel having an arbitrary point located at inner sides of the three supporting points, a first axis which is an axis located on a specified plane including the arbitrary point and passing the arbitrary point, a second axis passing the arbitrary point and orthogonal to the first axis on the plane, and a third axis which is an axis perpendicular to the plane and passing the arbitrary point, wherein the barrel unit includes:

a first actuator for giving a driving force along a direction parallel with the third axis, the first supporting point being an acting portion of the first actuator, a second actuator for giving a driving force along a direction parallel with the third axis, the second supporting point located at a side of the first or second axis opposite to the first supporting point being an acting portion of the second actuator, a supporting portion provided at the third supporting point to support the barrel rotatably about a first rotation axis extending in a direction parallel with the first axis and/or a second rotation axis extending in a direction parallel with the second axis by the driving forces given by the first and second actuators, a first position detector located on or near a line connecting the acting portions of the first and second actuators, including a detecting portion near the acting portion of the first actuator and adapted to detect the rotational posture of the barrel, and a second position detector located on or near the line connecting the acting portions of the first and second actuators, including a detecting portion near the acting portion of the second actuator and adapted to detect the rotational posture of the barrel.

13. An image sensing apparatus according to claim 12, wherein:

the first and second position detectors include first and second switcher for outputting first and second signals H, L which change upon detecting the position detecting point, the barrel unit further includes a position controller for controlling the posture of the barrel by causing the first and second actuators to operate, and the posture controller drives the first and second actuators in the same direction with the first signals H or the second signals L outputted from both first and second switcher, and subsequently executes such a control as to drive the first and second actuators in opposite directions such that the barrel is rotated with the disposed position of the first or second switcher having outputted the second signal L or the first signal H or a position proximate thereto as a center of rotation if the barrel is rotated up to a position where the second signal L or the first signal H is outputted from either one of the first and second switcher.

14. An image sensing apparatus according to claim 12, wherein:

the first and second position detectors include first and second switcher for outputting first and second signals H, L which change upon detecting the position detecting point, the barrel unit further includes a position controller for controlling the posture of the barrel by causing the first and second actuators to operate, and the posture controller is capable of successively performing:

a first operation of causing at least one of the first and second actuators to operate such that the first signals H or the second signals L are outputted from both first and second switcher, a second operation of causing at least one of the first and second actuators to operate such that the first signal H or the second signal L is outputted from either one of the first and second switcher, and a third operation of causing the first and second actuators to operate such that the barrel is rotated with the disposed position of the first or second switcher having outputted the second signal L or the first signal H in the second operation or a position proximate thereto as a center of rotation and the first signals H or the second signals L are outputted from both first and second switcher.

* * * * *